(12) United States Patent
Hamada et al.

(10) Patent No.: US 8,208,782 B2
(45) Date of Patent: Jun. 26, 2012

(54) RECORDING DEVICE, RECORDING METHOD, AND RECORDING PROGRAM

(75) Inventors: Toshiya Hamada, Minato-Ku (JP); Kenichiro Aridome, Minato-ku (JP)

(73) Assignee: Sony Corporation, Tokyo (JP)

( * ) Notice: Subject to any disclaimer, the term of this patent is extended or adjusted under 35 U.S.C. 154(b) by 1119 days.

(21) Appl. No.: 11/916,466

(22) PCT Filed: Apr. 4, 2007

(86) PCT No.: PCT/JP2007/057931
§ 371 (c)(1),
(2), (4) Date: Dec. 4, 2007

(87) PCT Pub. No.: WO2007/117016
PCT Pub. Date: Oct. 18, 2007

(65) Prior Publication Data
US 2009/0034940 A1    Feb. 5, 2009

(30) Foreign Application Priority Data
Apr. 6, 2006  (JP) .................................. 2006-105535

(51) Int. Cl.
*G06F 21/00* (2006.01)
(52) U.S. Cl. ........................... 386/95; 386/248; 386/239
(58) Field of Classification Search ................... 386/95, 386/239, 248
See application file for complete search history.

(56) References Cited

U.S. PATENT DOCUMENTS

| | | | | |
|---|---|---|---|---|
| 7,236,687 B2* | 6/2007 | Kato et al. | .................... | 386/248 |
| 7,483,618 B1* | 1/2009 | Edwards et al. | .............. | 386/278 |
| 7,512,322 B2* | 3/2009 | Seo et al. | ....................... | 386/248 |
| 7,551,843 B2* | 6/2009 | Uesaka et al. | ................. | 386/278 |
| 7,580,613 B2* | 8/2009 | Kato et al. | .................... | 386/248 |
| 7,583,887 B2* | 9/2009 | Kim et al. | ..................... | 386/248 |
| 7,636,509 B2* | 12/2009 | Davis | ............................ | 386/239 |
| 7,646,967 B2* | 1/2010 | Kato et al. | .................... | 386/248 |
| 7,661,000 B2* | 2/2010 | Ueda et al. | .................... | 713/193 |
| 7,801,900 B2* | 9/2010 | Noma | ............................ | 707/748 |
| 2004/0223741 A1* | 11/2004 | Yoo et al. | ........................ | 386/95 |
| 2006/0051063 A1* | 3/2006 | Kim et al. | ....................... | 386/95 |

(Continued)

FOREIGN PATENT DOCUMENTS

JP        2004 328450        11/2004

(Continued)

*Primary Examiner* — Farid Homayounmehr
(74) *Attorney, Agent, or Firm* — Oblon, Spivak, McClelland, Maier & Neustadt, L.L.P.

(57) ABSTRACT

When the BD-ROM standard is extended to recordable record mediums, a system which stores title numbers when a title is deleted and a system which stores the order of which titles were recorded when a title is deleted and which changes the title numbers are allowed to co-exist. Information title_id_ref that represents a title is added to a play list to which the title belonged when the play list was created. When a disc from which a title was deleted by a recorder A that stores the order of which titles were recorded, but not file numbers is loaded into a recorder B that stores title numbers, the recorder B rewrites the title number of the index based on information title_id_ref. A play list corresponding to a title that was deleted and its number was unused and an object that references the play list are created and a title that calls the object is registered to the index. Thus, the recorder A and the recorder B can have compatibility with respect to editing a title.

6 Claims, 25 Drawing Sheets

U.S. PATENT DOCUMENTS

| | | | |
|---|---|---|---|
| 2006/0140079 A1* | 6/2006 | Hamada et al. | 369/47.1 |
| 2007/0183740 A1* | 8/2007 | Ando et al. | 386/46 |
| 2007/0248321 A1 | 10/2007 | Hamada et al. | |
| 2007/0248322 A1 | 10/2007 | Hamada et al. | |

FOREIGN PATENT DOCUMENTS

| | | |
|---|---|---|
| JP | 2005 25922 | 1/2005 |
| JP | 2006 31744 | 2/2006 |

* cited by examiner

Fig. 9

| SYNTAX | DATA LENGTH (BITS) | MNEMONIC |
|---|---|---|
| index.bdmv { | | |
|     type_indicator | 8 * 4 | bslbf |
|     version_number | 8 * 4 | bslbf |
|     Indexes_start_address | 32 | uimsbf |
|     ExtensionData_start_address | 32 | uimsbf |
|     reserved_for_future_use | 192 | bslbf |
|     AppInfoBDMV() | | |
|     for (i=0; i<N1; i++) { | | |
|         padding_word | 16 | bslbf |
|     } | | |
|     Indexes() | | |
|     for (i=0; i<N2; i++) { | | |
|         padding_word | 16 | bslbf |
|     } | | |
|     ExtensionData() | | |
|     for (i=0; i<N3; i++) { | | |
|         padding_word | 16 | bslbf |
|     } | | |
| } | | |

Fig. 10

| SYNTAX | DATA LENGTH (BITS) | MNEMONIC |
|---|---|---|
| Indexes() { | | |
|     length | 32 | uimsbf |
|     FirstPlayback() { | | |
|         '01' | 2 | uimsbf |
|         reserved | 30 | bslbf |
|         HDAVC_Title_playback_type | 2 | uimsbf |
|         reserved | 14 | bslbf |
|         FirstPlayback_mobj_id_ref | 16 | uimsbf |
|         reserved | 8 * 4 | bslbf |
|     } | | |
|     TopMenu() { | | |
|         '01' | 2 | uimsbf |
|         reserved | 30 | bslbf |
|         '01' | 2 | uimsbf |
|         reserved | 14 | bslbf |
|         TopMenu_mobj_id_ref | 16 | uimsbf |
|         reserved | 8 * 4 | bslbf |
|     } | | |
|     number_of_Titles | 16 | uimsbf |
|     for (title_id=0; title_id < number_of_Titles; title_id++) { | | |
|         Title[title_id]() { | | |
|             '01' | 2 | uimsbf |
|             reserved | 46 | bslbf |
|             Title_mobj_id_ref[title_id] | 16 | uimsbf |
|             reserved | 8 * 4 | bslbf |
|         } | | |
|     } | | |
| } | | |

Fig. 11

| SYNTAX | DATA LENGTH (BITS) | MNEMONIC |
|---|---|---|
| MovieObject.bdmv { | | |
|   type_indicator | 8 * 4 | bslbf |
|   version_number | 8 * 4 | bslbf |
|   ExtensionData_start_address | 32 | uimsbf |
|   reserved_for_future_use | 224 | bslbf |
|   MovieObjects() | | |
|   for (i=0; i<N1; i++) { | | |
|     padding_word | 16 | bslbf |
|   } | | |
|   ExtensionData() | | |
|   for (i=0; i<N2; i++) { | | |
|     padding_word | 16 | bslbf |
|   } | | |
| } | | |

Fig. 12

| SYNTAX | DATA LENGTH (BITS) | MNEMONIC |
|---|---|---|
| MovieObjects() { | | |
|    length | 32 | uimsbf |
|    reserved | 32 | bslbf |
|    number_of_mobjs | 16 | uimsbf |
|    for (mobj_id=0; mobj_id<number_of_mobjs; mobj_id++) { | | |
|      MovieObject[mobj_id]() { | | |
|        TerminalInfo() { | | |
|          '1' | 1 | bslbf |
|          '0' | 1 | bslbf |
|          '0' | 1 | bslbf |
|          reserved | 13 | bslbf |
|        number_of_navigation_commands[mobj_id] | 16 | uimsbf |
|        for (command_id=0; command_id<number_of_navigation_commands[mobj_id]; command_id++){ | | |
|          navigation_command[mobj_id][command_id] | 96 | bslbf |
|        } | | |
|      } | | |
|    } | | |
| } | | |

*Fig. 13*

| SYNTAX | DATA LENGTH (BITS) | MNEMONIC |
| --- | --- | --- |
| ExtensionData() { | | |
|     length | 32 | uimsbf |
|     if(length !=0){ | | |
|         data_block_start_address | 32 | uimsbf |
|         reserved_for_word_align | 24 | bslbf |
|         number_of_ext_data_entries | 8 | uimsbf |
|         for (i=0; i<*number_of_ext_data_entries*; i++) { | | |
|             ext_data_entry() { | | |
|                 ID1 | 16 | uimsbf |
|                 ID2 | 16 | uimsbf |
|                 ext_data_start_address | 32 | uimsbf |
|                 ext_data_length | 32 | uimsbf |
|             } | | |
|         } | | |
|         for (i=0; i<L1; i++) { | | |
|             padding_word | 16 | bslbf |
|             padding_word | 16 | bslbf |
|         } | | |
|         data_block() | 32+ 8 * (length − data_block_start _address) | |
|     } | | |
| } | | |

*Fig. 17*

| SYNTAX | DATA LENGTH (BITS) | MNEMONIC |
|---|---|---|
| IndexExtensionData(){ | | |
|     type_indicator | 8 * 4 | uimsbf |
|     reserved | 8 * 4 | bslbf |
|     TableOfPlayLists_start_address | 32 | uimsbf |
|     MakersPrivateData_start_address | 32 | uimsbf |
|     reserved_for_future_use | 192 | bslbf |
|     UIAppInfoHDAVC() | | |
|     for(i=0; i< N1;i++) { | | |
|         padding_word | 16 | bslbf |
|     } | | |
|     TableOfPlayLists() | | |
|     for(i=0; i< N2;i++) { | | |
|         padding_word | 16 | bslbf |
|     } | | |
|     MakersPrivateData() | | |
|     for (i=0; i< N3;i++){ | | |
|         padding_word | 16 | bslbf |
|     } | | |
| } | | |

Fig. 18

| SYNTAX | DATA LENGTH (BITS) | MNEMONIC |
|---|---|---|
| TableOfPlayLists() { | | |
|     length | 32 | uimsbf |
|     number_of_PlayLists | 16 | bslbf |
|     for(i=0; i< number_of_PlayLists;i++){ | | |
|         PlayList_file_name | 8 * 5 | bslbf |
|         reserved_for_future_use | 6 | bslbf |
|         PlayList_attribute | 2 | uimsbf |
|         reserved_for_future_use | 16 | bslbf |
|         title_id_ref | 16 | uimsbf |
|     } | | |
| } | | |

RECORDING DEVICE, RECORDING METHOD, AND RECORDING PROGRAM

TECHNICAL FIELD

The present invention relates to a recording apparatus, a recording method, and a record program that are capable of having compatibility with a record medium having a format of an AV (Audio/Video) stream, reproduction control information that represents its reproduction region and its reproduction order, an object that specifies the reproduction control information, and a table that contains a title calling the object so as to easily create a menu screen.

For example, the present invention is applicable to a recording apparatus, a recording method, and a record program that allow a menu screen to have compatibility with "Blu-ray Disc Read-Only Format", which is a reproduction-only format of a Blu-ray disc (registered trademark).

BACKGROUND ART

In recent years, as a standard for a disc type record medium that is recordable and that is detachable from a recording and reproducing apparatus, the Blu-ray Disc standard has been proposed. In the Blu-ray Disc standard, as a record medium, a disc having a diameter of 12 cm and a cover thickness of 0.1 mm is used. As an optical system, a blue-purple laser having a wavelength of 405 nm and an objective lens having an aperture of 0.85 are used. With this structure, the Blu-ray Disc standard accomplishes a recording capacity of 27 gigabytes (GB) (max). Thus, on a Blu-ray disc, a Japanese BS digital high-vision broadcast program can be recorded for two hours or longer without deterioration of picture quality.

As sources of audio/video (AV) signals recorded on recordable optical discs, it is contemplated that there will be analog signals of for example existing analog television broadcasts and digital signals of for example BS digital broadcasts. In the Blu-ray Disc standard, standards that define recording methods of these broadcasts have been established.

On the other hand, as derivative standards of the current Blu-ray Disc standard, the development of reproduction-only record mediums on which movies, music, and so forth are pre-recorded are being actively performed. As disc shaped record mediums on which movies and music are recorded, DVDs (Digital Versatile Discs) have been widespread. A reproduction-only optical disc based on the Blu-ray Disc standard has a large capacity, a high speed transfer rate, and so forth and can contain a high-vision picture for two hours or more with high picture quality. Thus, the Blu-ray disc is largely different from the current DVD and superior thereto in these features.

In the following, the standard of a reproduction-only record medium based on the Blu-ray disc standard is referred to as the BD-ROM (Blu-ray Disc-Read Only Memory) standard. On the other hand, the standard of a recordable record medium based on the Blu-ray Disc standard is referred to as the BD-RE standard. Patent document "Japanese Patent Application 2004-21886" describes the BD-ROM standard, which is a reproduction-only type Blu-ray disc.

According to the BD-ROM standard, video data are recorded as clips. A reproduction region of a clip can be specified with a movie play list (MoviePlayList). In this case, a block of data as a unit of which continuously synchronous reproduction, namely real time reproduction, is assured, is referred to as a clip. For example, video data that exist as one file on a record medium is a clip. A movie play list specifies a reproduction start point (IN point) and a reproduction end point (OUT point) of each of a plurality of clips. Thus, a movie play list can specify a reproduction region of each of plurality of clips and a reproduction order of clips.

A movie play list (hereinafter abbreviated as a play list) is specified and the specified movie play list is reproduced by a navigation command of a movie object (MovieObject). Movie objects are listed as entries of titles on an index table. The index table is data that are initially read when the disc is loaded into the player. When the disc is loaded into the player, the user can see titles contained in the index table.

Moreover, in the BD-ROM standard, the reference relationship of which clips and play lists are referenced each other can be freely set. For example, a particular clip can be referenced from two play lists having different IN points and OUT points. In addition, the reference relationship of which titles and movie objects are referenced each other can be freely set.

FIG. 1 schematically shows the relationship of titles, movie objects, and play lists according to the BD-ROM standard. When the disc is loaded into the player, first playback (FirstPlayBack) and top menu (TopMenu) are initially read from the index table. A trailer and the top menu are reproduced from the disc according to movie objects contained in the first playback (FirstPlayBack) and the top menu (TopMenu). The user can command the player to reproduce each title from the disc.

FIG. 1 shows the structure of a scenario. In this scenario, the first playback and the top menu specify movie object #4. From movie object #4, play list #100 and play list #101 are referenced. As a result, a top screen for the first playback and the top menu are displayed.

In other words, in the example shown in FIG. 1, the menu screen of movie object #4 is displayed. After the menu screen is displayed, the reproduction of movie object #0 is started. While the menu screen is displayed, when title jump is selected, the control flow jumps to title #1. The reproduction of movie object #0 is started from title #1.

The top menu navigates the reproduction of six titles, title #1 to title #6. Title #1 and title #3 cause the player to reproduce movie object #0. Title #4 and title #6 cause the player to reproduce movie object #2. In addition, from movie object #4 for the reproduction of the top menu, the control flow jumps to title #1 and to movie object #0 referenced by title #1. Movie object #0 contains a command that causes the player to reproduce two play lists, play list #100 and play list #101. Movie object #3 contains a command that causes the player to reproduce three play lists, play list #4, play list #5, and play list $6.

As described above, according to the BD-ROM standard, a plurality of titles can cause the player to reproduce one movie object. The control flow can jump from one object to a title and a movie object. One movie object can cause the player to reproduce a plurality of play lists. When titles, movie objects, and play lists are freely referenced each other, the content creator can easily realize his or her idea.

DVD recorders that record AV (Audio/Video) data to a recordable DVD according to the DVD-Video (Digital Versatile Disc-Video) standard defined for existing reproduction-only record mediums have widespread. Thus, it is contemplated that the BD-ROM standard that has been developed as a standard for reproduction-only record mediums will be used as one of recording systems for home-use recorders. Thus, a standard that extends the BD-ROM standard to recordable record mediums is being developed.

When the BD-ROM standard is extended to recordable record mediums, titles recorded on the disc need to be specified from a top menu reproduced according to an index table and to be reproduced. In addition, for recordable recording mediums, titles need to be edited. For example, titles need to be deleted or added.

In the case that such a record medium is used for a video camera, when a record button or the like is pressed and the recording operation is started, new clips are recorded. When the record button is released, the recording operation is stopped and titles corresponding to the clips are added. Likewise, when recorded clips are deleted, titles corresponding thereto are deleted.

It is assumed that titles are managed by assigning title numbers in the order of which clips were recorded. In this case, it is contemplated that there are two management methods. In one management method, title numbers are stored regardless of whether titles were edited. In the other management method, when titles are edited, the order of which they were recorded is stored and title numbers are changed as the titles are edited.

For example, as exemplified in FIG. 2A, it is contemplated that there are title #1, title #2, title #3, and title #4. When title #2 is deleted, as exemplified in FIG. 2B, in the first management method, their title numbers are stored. Thus, title #2 that was deleted becomes an unused number. In contrast, in the second management method, as exemplified in FIG. 2C, the title numbers after title #2 that was deleted are decreased by 1. In the example shown in FIG. 2C, title #3 and title #4 that were edited become title #2 and title #3, respectively.

The first management method or the second management method is implemented to the recorder depending on its design concept or the like.

However, in this case, there is a problem of which compatibility of a menu screen and so forth is not maintained between a recorder in which the first management method has been implemented and a recorder in which the second management method has been implemented.

With reference to FIG. 2A, FIG. 2B, and FIG. 2C, when a menu screen created according to the first management method is reproduced by an apparatus in which the second management method has been implemented, contradiction may occur in such a manner that a menu corresponding to title #4 shown in FIG. 2B is not displayed. Likewise, when a menu screen created according to the second management method is reproduced by an apparatus in which the first management method has been implemented, contradiction may occur in such a manner that although title #2 shown in FIG. 2C is displayed, it is not able to be reproduced.

DISCLOSURE OF THE INVENTION

Therefore, an object of the present invention is to provide a recording apparatus, a recording method, and a record program that allow a system that stores title numbers regardless of whether titles were edited and a system that stores the order of which titles were recorded and changes title numbers as the titles are edited to be satisfied when the BD-ROM standard is extended to recordable record mediums.

The present invention is a recording apparatus which records at least content data and reproduction control information to a record medium, the content data being caused to be reproduced with the reproduction control information, the recording apparatus comprising a recording section which records the content data to the record medium, and a controlling section which causes a clip information file, a play list file, an object file, and an index file to be created for the content data recorded on the record medium, the clip information file containing clip information which represents attribute information of the content data, the play list file containing a play list which calls the clip information, the object file containing an object which represents a method of reproducing the content data which calls the play list, the index file containing an index table which contains a title which calls the object, wherein the controlling section causes information which represents the title to which the play list file belonged to be added to the index file when the play list file is created.

In addition, the present invention is a recording method of recording at least content data and reproduction control information to a record medium, the content data being caused to be reproduced with the reproduction control information, the recording method comprising the steps of causing a clip information file, a play list file, an object file, and an index file to be created for the content data recorded on the record medium, the clip information file containing clip information which represents attribute information of the content data, the play list file containing a play list which calls the clip information, the object file containing an object which represents a method of reproducing the content data which calls the play list, the index file containing an index table which contains a title which calls the object; and causing information which represents the title to which the play list file belonged to be added to the index file when the play list file is created.

In addition, the present invention is a record program which causes a computer device to execute a recording method of recording at least content data and reproduction control information to a record medium, the content data being caused to be reproduced with the reproduction control information, the recording method comprising the steps of causing a clip information file, a play list file, an object file, and an index file to be created for the content data recorded on the record medium, the clip information file containing clip information which represents attribute information of the content data, the play list file containing a play list which calls the clip information, the object file containing an object which represents a method of reproducing the content data which calls the play list, the index file containing an index table which contains a title which calls the object; and causing information which represents the title to which the play list file belonged to be added to the index file when the play list file is created.

As described above, according to the present invention, a clip information file, a play list file, an object file, and an index file are caused to be created for the content data recorded on the record medium, the clip information file containing clip information which represents attribute information of the content data, the play list file containing a play list which calls the clip information, the object file containing an object which represents a method of reproducing the content data which calls the play list, the index file containing an index table which contains a title which calls the object. Information which represents the title to which the play list file belonged is caused to be added to the index file when the play list file is created. Thus, it can be easily known that title were deleted by another apparatus according to a system that does not store title numbers As described above, according to the present invention, a clip information file, a play list file, an object file, and an index file are caused to be created for the content data recorded on the record medium, the clip information file containing clip information which represents attribute information of the content data, the play list file containing a play list which calls the clip information, the object file containing an object which represents a method of reproducing the content data which calls the play list, the index file containing an index table which contains a title which calls the object. Information which represents the title to which the play list file belonged is caused to be added to the index file when the play list file is created. Thus, even if titles were deleted by another apparatus according to a system that does not store title numbers, the title numbers that were deleted can be restored according to information that represents titles to which play list belonged when they were created.

BRIEF DESCRIPTION OF DRAWINGS

FIG. 9 is a schematic diagram showing a syntax representing an exemplary structure of file "index.bdmv";

FIG. 10 is a schematic diagram showing a syntax representing an exemplary structure of block Indexes( );

FIG. 11 is a schematic diagram showing a syntax representing an exemplary structure of file "MovieObject.bdmv";

FIG. 12 is a schematic diagram showing a syntax representing an exemplary structure of block MovieObjects( );

FIG. 13 is a schematic diagram showing a syntax representing an exemplary structure of block ExtensionData( );

FIG. 17 is a schematic diagram showing a syntax representing an exemplary structure of block data_block( ) in field ExtensionData( ) in file "index.bdmv";

FIG. 18 is a schematic diagram showing a syntax representing an exemplary structure of block TableOfPlayLists( );

BEST MODES FOR CARRYING OUT THE INVENTION

Next, with reference to the accompanying drawings, an embodiment of the present invention will be described. For easy understanding of an embodiment of the present invention, a management structure of content, namely AV (audio and video) data, recorded on a BD-ROM as a read-only type Blu-ray Disc, defined in "Blu-ray Disc Read Only Format Ver 1.0 part 3 Audio Visual Specification" for Blu-ray Discs, will be described for an applicable portion of which the BD-ROM standard is extended to recordable record mediums. In the following, the management structure of a BD-ROM is referred to as the BDTV format. For convenience, the format of which the BDM format is extended to recordable record mediums is referred to as the extended BMDV format.

A bit stream encoded according to encoding systems, for example the MPEG (Moving Pictures Experts Group) video and the MPEG audio, and multiplexed according to the MPEG2 system is referred to as a clip AV stream (or an AV stream). A clip AV stream is recorded as a file on a disc according to a file system defined in "Blu-ray Disc Read Only Format part 2", which is one of standards for Blu-ray Discs. This file is referred to as a clip AV stream file (or an AV stream file).

A clip AV stream file is a management unit on a file system. Thus, the user may not be able to easily understand a clip AV stream file as a management unit. From a view point of user's friendliness, it is necessary to provide a mechanism of combining video content that has been divided into a plurality of clip AV stream files into one file and reproducing the combined file and a mechanism of reproducing only a part of clip AV stream files. In addition, it is necessary to record a database that contains information allowing a special reproduction and a cue point reproduction to be smoothly performed on a disc. "Blu-ray Disc Read Only Format part 3", which is one of standards for Blu-ray Discs, defines this database.

Figure 3:
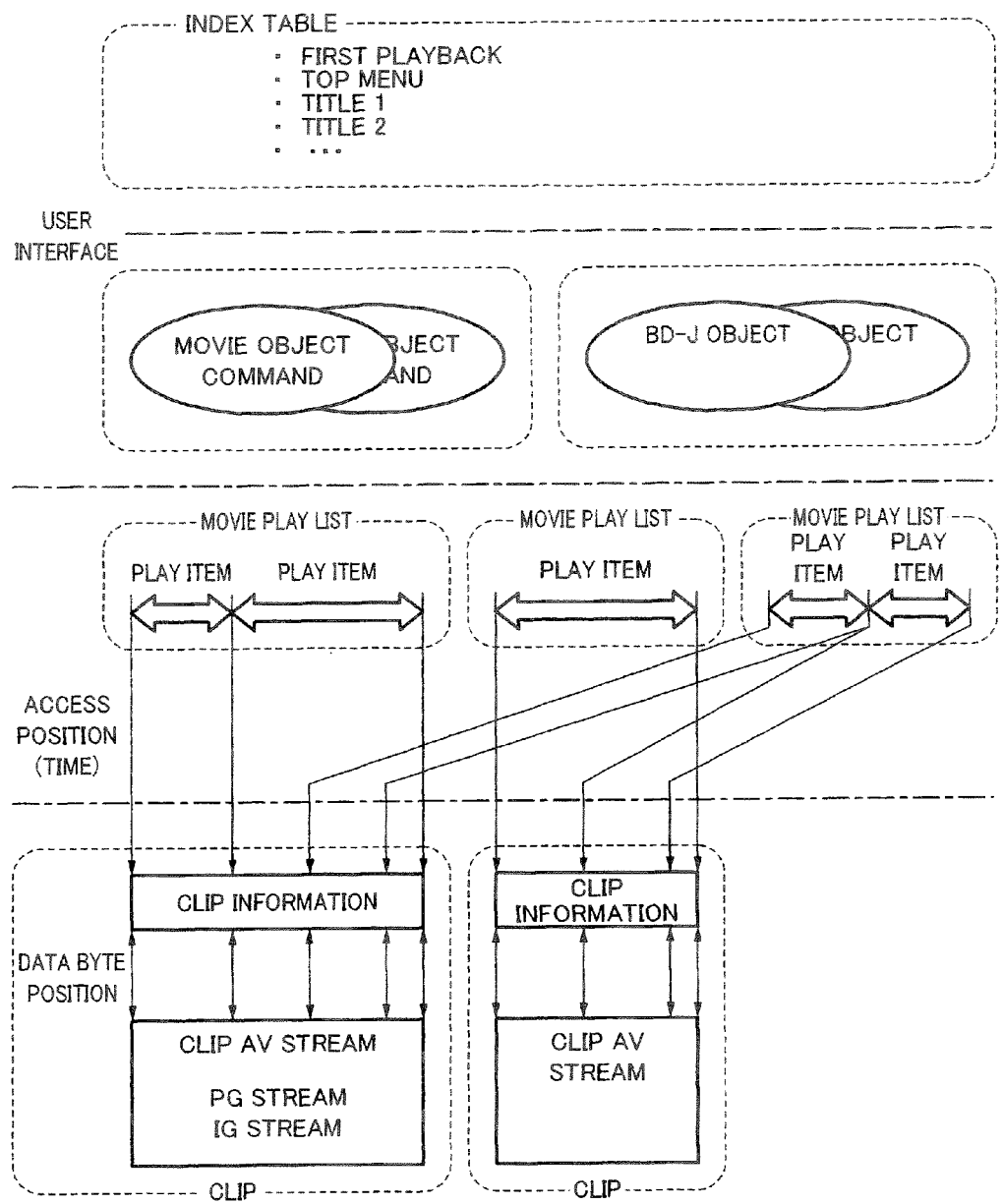
FIG. 3 is a schematic diagram showing an outline of a data model of a BD-ROM.

FIG. 3 shows an outline of a data model of a BD-ROM. As shown in FIG. 3, a BD-ROM is composed of four hierarchical layers. The lowest layer is a layer on which a clip AV stream is placed (for convenience, hereinafter this layer is referred to as the clip layer). Placed above the clip layer is a layer on which a movie play list (Move PlayList), with which a reproduction position of a clip AV stream is specified, and a play item (PlayItem) (for convenience, hereinafter this layer is referred to as the play list layer). Placed above the play list layer is a layer on which a movie object (Movie Object) composed of commands that specify the reproduction order of move play lists and so forth (for convenience, hereinafter this layer is referred to as the object layer). The highest layer is a layer on which an index table with which titles and so forth recorded on the BD-ROM are managed is placed (for convenience, hereinafter this layer is referred to as the index layer).

Next, the clip layer will be described. A clip AV stream is a bit stream of which video data and audio data have been multiplexed for example according to the MPEG2 TS (transport stream) format. Information about the clip AV stream is recorded as clip information in a file.

In addition, a presentation graphics (PG) stream as a graphics stream for subtitle and an interactive graphics (IG) stream as a stream of data (button image data) for a menu have been multiplexed into the clip AV stream.

A pair of a clip AV stream file and a clip information file that contains clip information corresponding to the clip AV stream file is treated as an object and referred to as a clip. In other words, a clip is one object composed of a clip AV stream and clip information.

A file is generally treated as a sequence of bytes. Contents of a clip AV stream file are mapped on the time base. An entry point of a clip is mainly specified on the time base. When a time stamp of an access point to a predetermined clip is given, a clip information file can be used to find out address information with which data are read from the clip AV stream file.

Next, the play list layer will be described. A movie play list specifies an AV stream file to be reproduced. A movie play list is composed of pairs of a reproduction start point (IN point) and a reproduction end point (OUT point) with which a reproduction portion of a specified AV stream file is specified. A pair of the reproduction start point and the reproduction end point is referred to as a play item (PlayItem). A movie play list is composed of a set of play items. When a play item is reproduced, a part of an AV stream file referenced by the play item is reproduced. In other words, a region of a clip is reproduced on the basis of information of an IN point and an OUT point of a play item.

Next, the object layer will be described. A movie object contains terminal information that associates an HDMV navigation command program with a move object. An HDMV navigation program is a command that causes a play list to be reproduced. For convenience, hereinafter an HDMV navigation command is abbreviated as a navigation command. The terminal information contains information with which a user's BD-ROM player is permitted to be interactively operated. Users operations such as a menu screen call operation and a title search operation are controlled on the basis of the terminal information.

A BD-J object is composed of an object based on a Java program (Java is a registered trademark). Since a BD-J object is not closely related to the present invention, its detailed description will be omitted.

Next, the index layer will be described. The index layer is composed of an index table. The index table is a top level table that defines titles of the BD-ROM disc. A module manager of BD-ROM resident system software controls the reproduction of data from the BD-ROM disc on the basis of title information contained in the index table.

Figure 4:
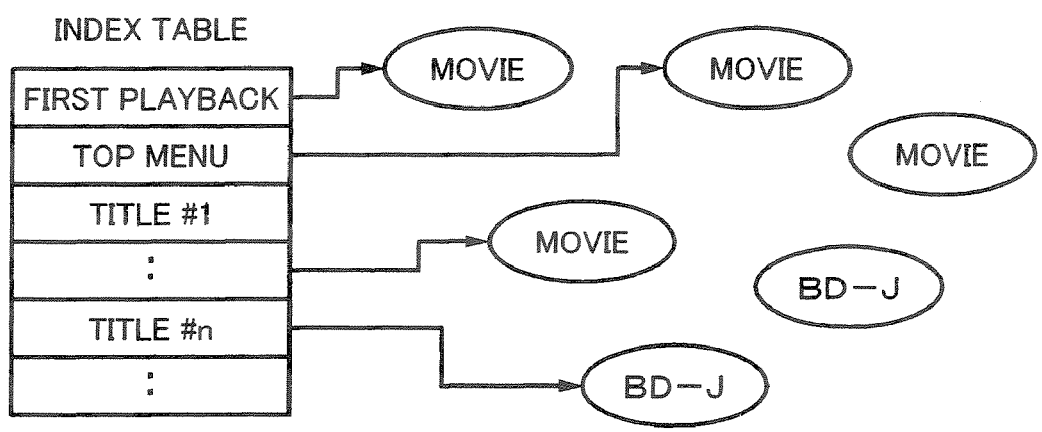
FIG. 4 is a schematic diagram describing an index table.

In other words, as outlined in FIG. 4, entries in an index table are referred to as titles. A first playback, a top menu, title #1, title #2, and so forth, which are entries of the index table, are all titles. Each title represents a link to a movie object or a BD-J object. Each title represents either an HDMV title or a BD-J title.

When content recorded on the current BD-ROM is a movie, the first playback is an advertisement picture (trailer) for a movie company that is displayed before the main portion of the movie. When content is a movie, the top menu is a menu screen on which for example the main part of the movie is reproduced, a chapter search operation is performed, subtitle and language are set, and a bonus picture is reproduced. A title is a picture selected from the top menu. A title may be structured as a menu screen.

Figure 5:
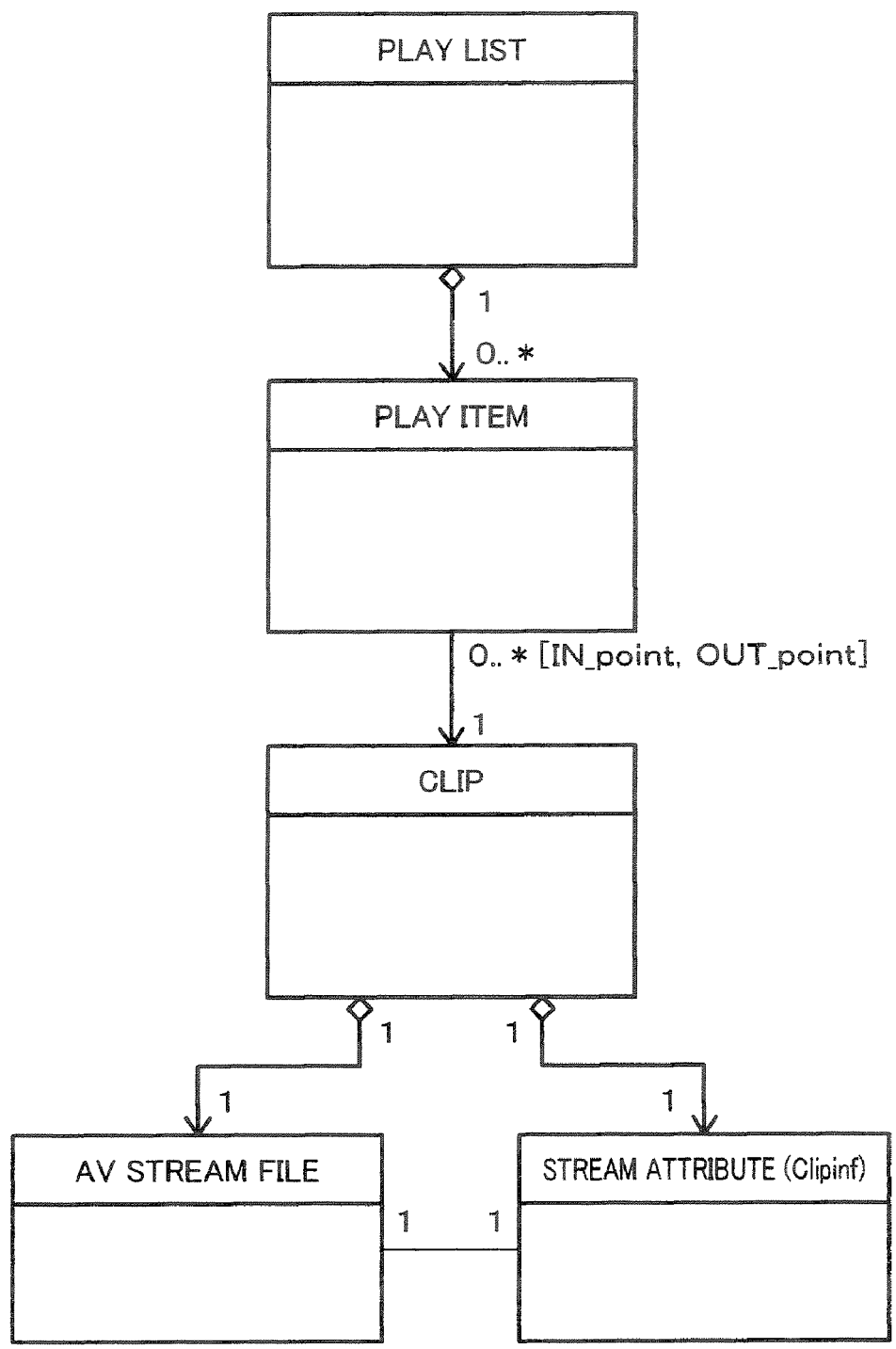
FIG. 5 is a UML chart showing a relationship of clip AV streams, clip information, clips, play items, and play lists.

FIG. 5 is a UML (Unified Modeling Language) chart showing a relationship of the foregoing clip AV streams, clip information (stream attributes), clips, play items, and play list. A play list is correlated with one or a plurality of play items. A play item is correlated with one clip. One clip can be correlated with a plurality of play items having a different start point and/or a different end point. One clip references one clip AV stream file. Likewise, one clip references one clip information file. One clip AV stream file is just correlated with one clip information file. With such a structure defined, a reproduction order can be non-destructively specified to reproduce only a desired portion without changing clip AV stream files.

Figure 6:
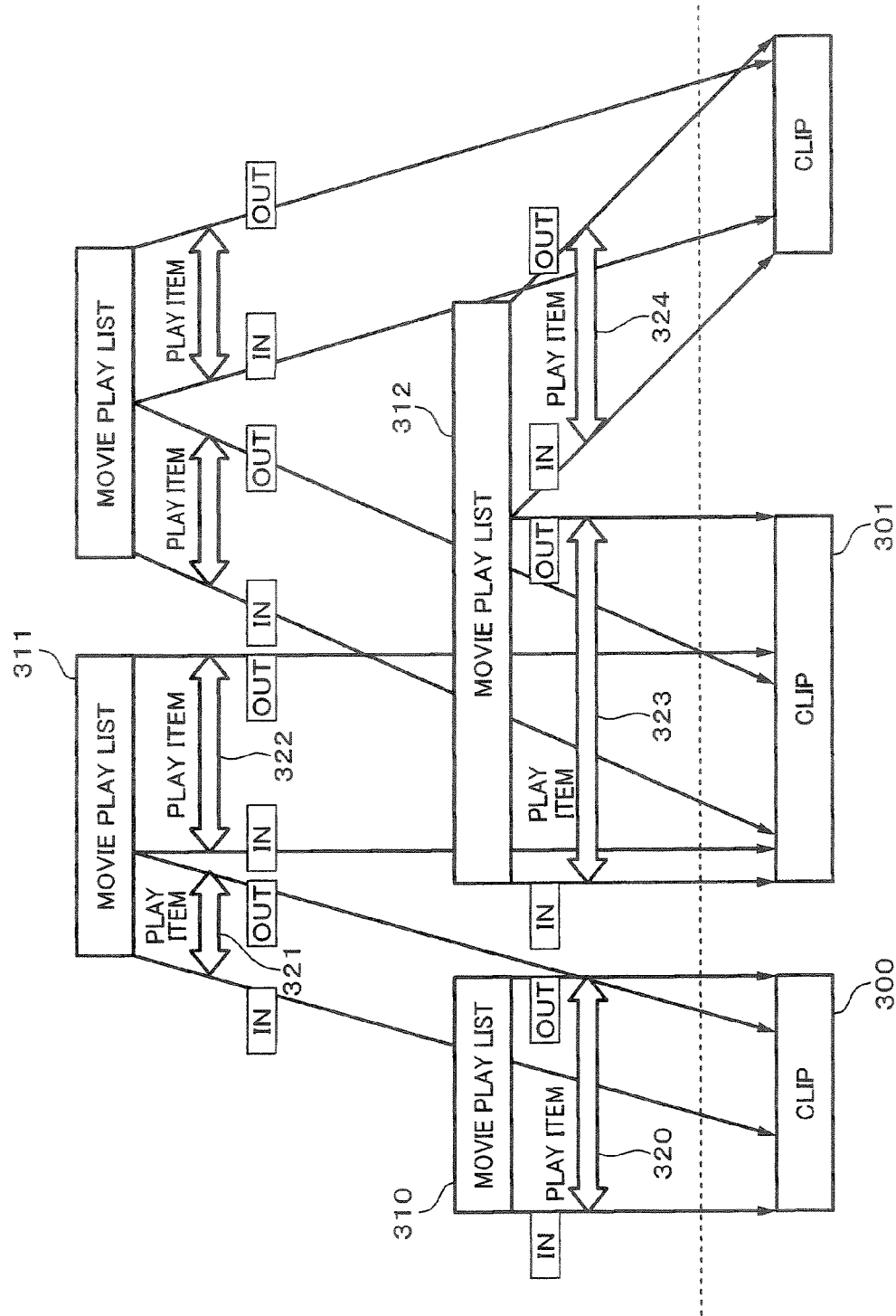
FIG. 6 is a schematic diagram describing a method of referencing one clip from a plurality of play lists.

In addition, as shown in FIG. 6, the same clip can be referenced by a plurality of play lists. In addition, a plurality of clips can be specified by one play list. A clip is referenced with an IN point and an OUT point of a play item in a play list. In the example shown in FIG. 6, a clip 300 is referenced by a play item 320 of a play list 310. In addition, the clip 300 is referenced for a region represented by an IN point and an OUT point of a play item 321 of a play list 311 that has the play item 321 and a play item 322. In addition, a clip 301 is referenced for a region represented by an IN point and an OUT point of the play item 322 of the play list 312. In addition, the clip 301 is referenced for a region represented by an IN point and an OUT point of a play item 323 of a play list 312 that has the play item 323 and a play item 324.

Figure 7:
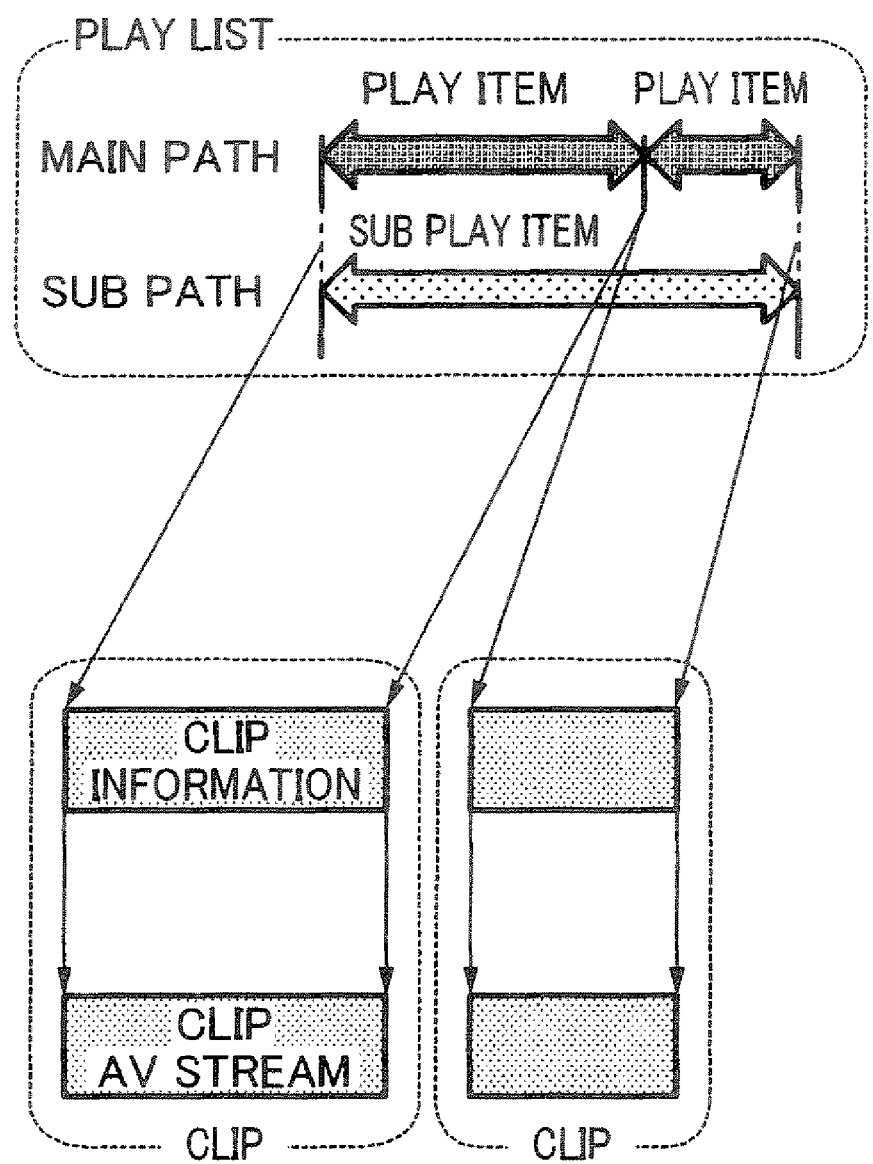
FIG. 7 is a schematic diagram describing a sub path.

As exemplified in FIG. 7, a play list can have a sub path corresponding to a sub play item against a main path corresponding to a play item that is mainly reproduced. For example, a play list can have a play item for after-record audio as a sub play item. When a predetermined condition is satisfied, a play list can have a sub play item (details will be omitted).

Figure 8:
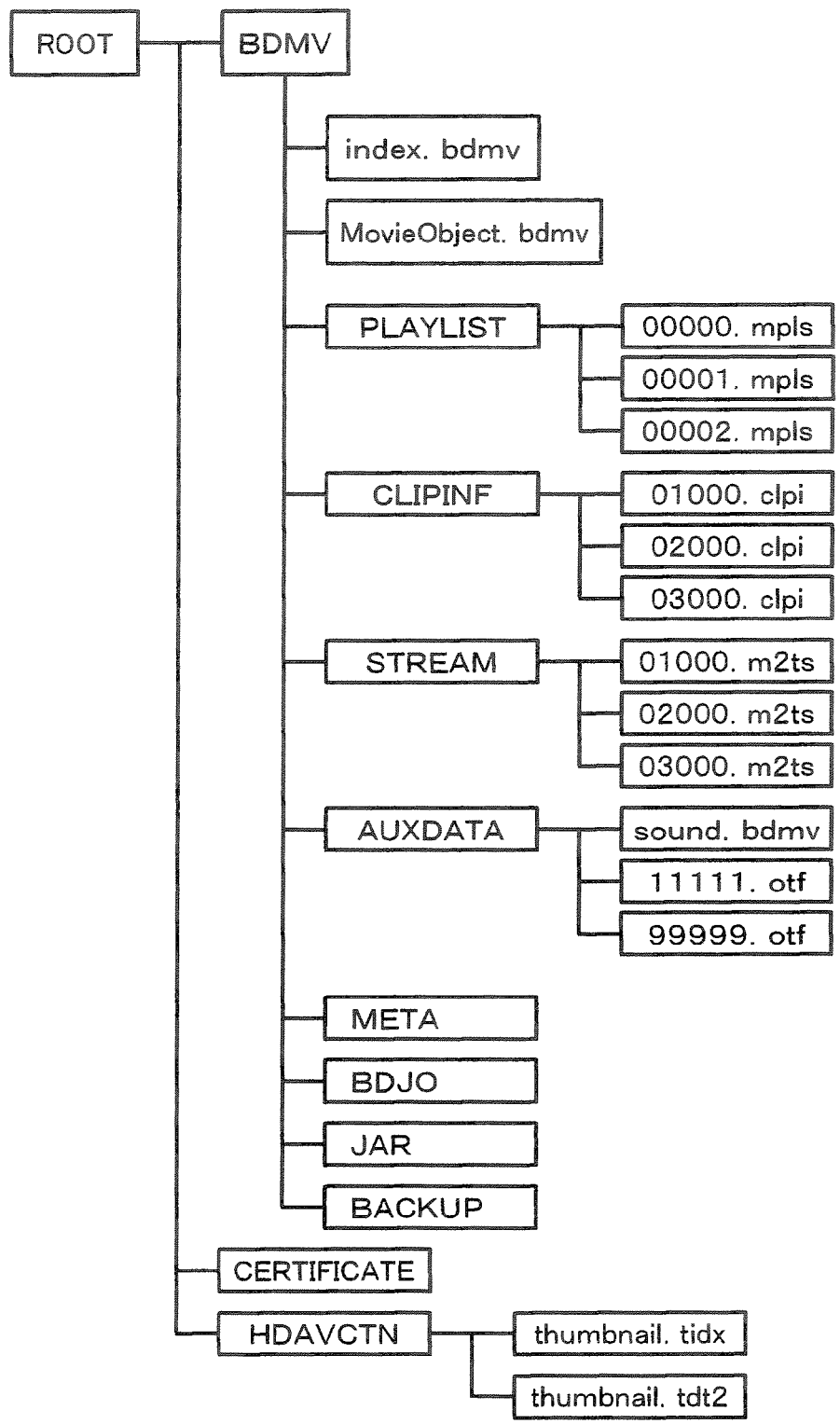
FIG. 8 is a schematic diagram describing a management structure of files recorded on a record medium.

Next, with reference to FIG. 8, a management structure for files on a BD-ROM, defined in "Blu-ray Disc Read Only Format part 13", will be described. Files are hierarchically managed with a directory structure. One directory (in FIG. 8, for example, a root directory) is created on the record medium. One recoding and reproducing system manages files placed below the root directory.

Placed below the root directory are directory "BDMV", directory "CERTIFICATE", and directory "HDAVCTN". Placed in directory "CERTIFICATE" is information about copyright. Placed in directory "HDAVCTN" are thumbnail files of which for example representative images of clips have been reduced in a predetermined size. Placed in directory "BDMV" is the data structure described with reference to FIG. 3.

Placed immediately below directory "BDMV" can be only two files "index.bdmv" and "MovieObject". Placed below directory "BDM" are directory "PLAYLIST", directory "CLIPINF", directory "STREAM", directory "AUXDATA", directory "META", directory "BDJO", directory "JAR", and directory "BACKUP".

File "index.bdmv" contains contents of directory "BDMV". In other words, file "index.bdmv" corresponds to an index table in the index layer, which is the highest layer. File "MovieObject.bdmv" contains information about at least one movie object. In other words, file "MovieObject.bdmv" corresponds to the foregoing object layer.

Directory "PLAYLIST" is a directory in which a database of play lists is placed. In other words, directory "PLAYLIST" contains file "xxxxx.mpls" that is a file of a movie play list. File "xxxxx.mpls" is a file created for each movie play list. In the file name, "xxxxx" followed by a "." (period) is a five-digit number. "mpls" preceded by the period is an extension fixed to this type of file.

Directory "CLIPINF" is a directory in which the database of clips is placed. In other words, directory "CLIPINF" contains file "zzzzz.clpi" that is a clip information file corresponding to a clip AV stream file. In the file name, "zzzzz" followed by a "." (period) is a five-digit number. "clpi" preceded by the period is an extension fixed to this type of file.

Directory "STREAM" is a directory in which AV stream files as an entity are placed. In other words, directory "STREAM" contains clip AV stream files corresponding to clip information files. A clip AV stream file is composed of an MPEG2 (Moving Pictures Experts Group 2) transport stream (hereinafter abbreviated as an MPEG2 TS). The file name of a clip AV stream file is "zzzzz.m2ts". When "zzzzz" followed by the period of the file name of the clip AV stream file is the same as that of the corresponding clip information file, their relationship can be easily grasped.

Directory "AUXDATA" contains sound files, font files, font index files, bit map files, and so forth with which a menu and so forth are displayed. File "sound.bdmv" contains sound data associated with an application of an HDMV interactive graphics stream. The file name of sound data is fixed to "sound.bdmv". File "aaaaa.otf" contains font data used for subtitle, the foregoing BD-J application, and so forth. In the file name, "aaaaa" followed by the period is a five-digit number. "otf" preceded by the period is an extension fixed to a file of this type. File "bdmv.fontindex" is an index file of fonts.

Directory "META" contains meta data files. Directory "BDJO" and directory "JAR" contain files associated with the foregoing BD-J objects. Directory "BACKUP" contains backups of the foregoing directories and files. Since directory "META", directory "BDJO", directory "JAR", and directory "BACKUP" are not directly related to the spirit of the present invention, their detailed description will be omitted.

Placed in directory "HDAVCTN" can be two types of thumbnail files, thumbnail.tidx and thumbnail.tdt2. Thumbnail file thumbnail.tidx contains information with which a thumbnail image contained in thumbnail file thumbnail.tdt2 is managed.

Among files shown in FIG. 8, those closely related to the present invention will be described in detail. First of all, file "index.bdmv", which is placed immediately below directory "BDMV", will be described. FIG. 9 shows a syntax representing an exemplary structure of file "index.bdmv". In this example, syntax is described on the basis of a syntax of C language, which is used as a programming language for computer devices and so forth. This applies to drawings that show syntaxes of other files.

In FIG. 9, field type_indicator has a data length of 32 bits and denotes that this file is an index table. Field version_number has a data length of 32 bits and represents a version of file "index.bdmv". Field "indexes_start_address" has a data length of 32 bits and represents the start address of block indexes( ) in this syntax.

Field ExtensionData_start_address has a data length of 32 bits and represents the start address of block Extension Data( ) of this syntax. Field ExtensionData_start_address represents the start address of block ExtensionData( ) as the relative number of bytes from the first byte of file "index.bdmv". The relative number of bytes starts with "0". When the value of field ExtensionData_start_address is "0", it denotes that file "index.bdmv" does not contain block Extension Data( ).

Field ExtensionData_start_address is followed by an area that has a data length of 192 bytes and is reserved for future extension. Block AppInfoBDMV( ) is a block in which the content creator can describe any information and does not affect the operation of the player and so forth.

Block indexes( ) is substantial contents of file "index.bdmv". A first playback reproduced when the disc is loaded into the play and a title (a movie object or a BD-J object) called from a top menu are specified according to the contents of file "index.bdmv". In the following description, movie objects and BD-J objects are collectively referred to as movie objects or the like. A movie play list file (that will be described later) is read according to a command contained in a movie object or the like called from the index table.

FIG. 10 shows a syntax representing an exemplary structure of block Indexes( ). In FIG. 10, portions do not directly relate to the present invention are represented as area Reserved. In other words, the structure shown in FIG. 10 is limited to the extended BDMV format for recordable record mediums. Field length has a data length of 32 bits and represents the data length immediately after field length to the end of block Indexes( ). Field length is followed by block FirstPlayback( ) and block TopMenu( ) in succession.

Block FirstPlayback( ) contains information about an object used in the first playback. Block FirstPlayback( ) starts with a field of fixed value "01" that denotes that an object used for the first playback is a movie object. Field HDAVC_Title_playback_type has a data length of two bits and represents a reproduction type of an HDAVC title. Field FirstPlayback_mobjid_ref has a bit length of 16 bits and represents an ID of the movie object used for the first playback.

The ID of the movie object is represented by value mobj_id used as a loop variable in a for loop statement of a movie object for example according to a syntax of a movie object that will be described with reference to FIG. 11 and FIG. 12. In this example, field FirstPlayback_mobj_id_ref contains value mobj_id corresponding to a movie object to be referenced.

Field FirstPlayback_mobj_id_ref of block FirstPlayback( ) in block Indexes( ) may represent a movie object of the top menu or a title.

Block TopMenu( ) contains information about an object used for the top menu. Block TopMenu( ) starts with a field of fixed value "01". Fixed value "01" is followed by area Reserved having a data length of 30 bits, followed by fixed value "01". Field TopMenu_mobj_id_ref has a data length of 16 bits that represents an ID of the movie object used for the top menu.

Block TopMenu( ) is followed by field number_of_Titles. Field number_of_Titles has a data length of 16 bits and represents the number of reproducible titles that the use can select. Block Title[title_id]( ) is contained the number of times represented by field number_of_Titles according to a for loop statement with an argument of value title_id. Block Title[title_id]( ) contains information of each title. Value title_id is a numeric value ranging from "0" to a value represented by field number_of_Titles and identifies a title.

Block Title[title_id]( ) starts with a field of fixed value "01", followed by area Reserved having a data length of 46 bits, followed by field Title_mobj_id_ref. Field Title_mobj_id_ref has a data length of 16 bits and represents an ID of a movie object used for this title.

FIG. 11 shows a syntax that represents an exemplary structure of file "MovieObject.bdmv" placed immediately below directory "BDMV". Field type_indicator has a data length of 32 bits (4 bytes) and denotes that this file is file "MovieObject.bdmv". Field type_indicator contains a character string composed of four characters encoded according to an encoding system defined in the ISO (International Organization for Standardization) 646. In the example shown in FIG. 11, field type_indicator contains four-character string "MOBJ" encoded according to a known system of the ISO 646. "MOBJ" denotes that this file is file "MovieObject.bdmv".

Field version_number has a data length of 32 bits (4 bytes) and represents a version number of file "MovieObject.bdmv". In file "MovieObject.bdmv", field version_number should be four-character string "0100" encoded according to an encoding system defined in the ISO 646.

Field ExtensionData_start_address has a data length of 32 bits and represents the start address of block Extension Data( ) of this syntax. Field ExtensionData_start_address represents the start address of block ExtensionData( ) as the relative number of bytes from the first byte of file "MovieObject.bdmv". The relative number of bytes starts with "0". When the value of field ExtensionData_start_address is "0", it denotes that file "MovieObject.bdmv" does not contain block ExtensionData( ).

Figure 1:
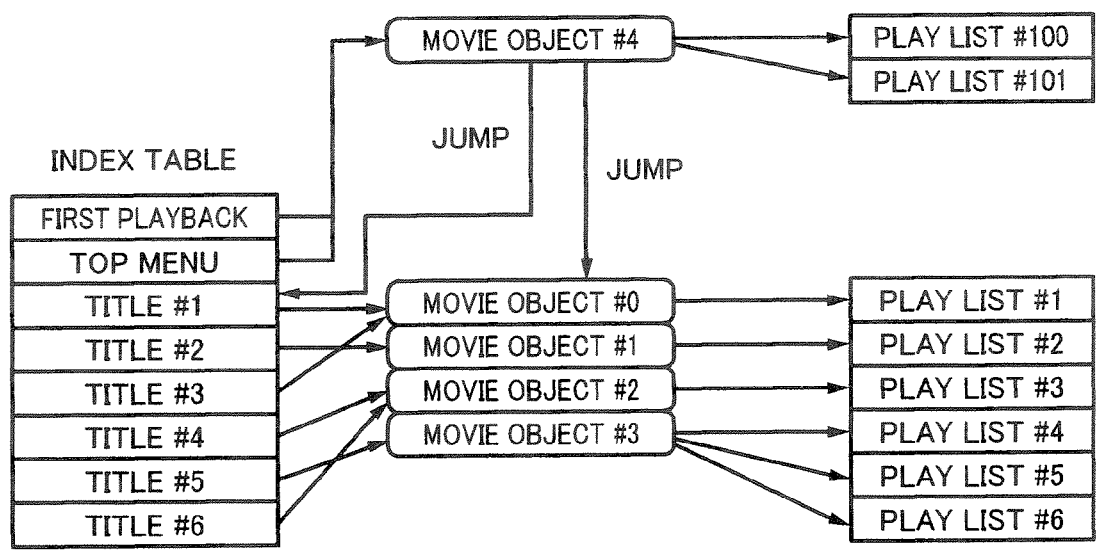
FIG. 1 is a schematic diagram showing an outline of an exemplary relationship of titles, movie objects, and play lists according to the BD-ROM standard.
Figure 2A:
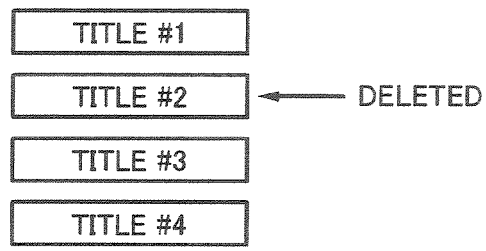
FIG. 2A, FIG. 2B, and FIG. 2C are schematic diagrams describing title management methods in which titles are edited.
Figure 2B:
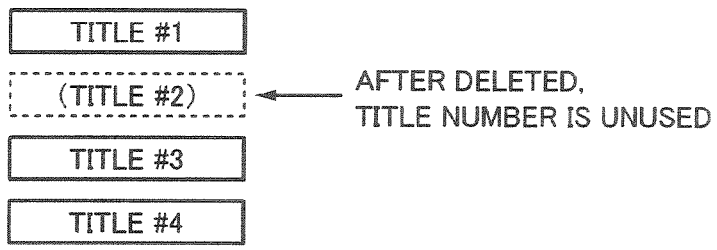
Figure 2C:
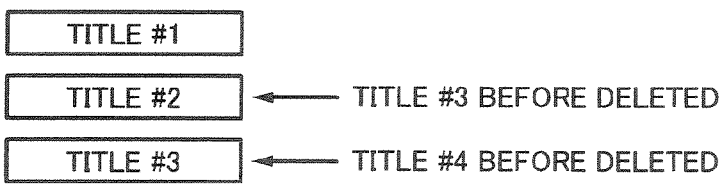

In the syntax shown in FIG. 1, field padding_word has a data length of 16 bits. Field padding_word is inserted into a for loop statement the number of times represented by value N1 or value N2 according to the syntax of file "MovieObject.bdmv". Value N1 or N2 is 0 or any positive integer. Field padding_word may contain any value.

Field ExtensionData_start_address is followed by an area having a data length of 224 bits that is reserved for future use. This area is followed by block MovieObjects( ) that is an entity of file "MovieObject.bdmv".

FIG. 12 shows a syntax that represents an exemplary structure of block MovieObjects( ). Field length has a data length of 32 bits and represents the length immediately after field length to the end of block MovieObjects( ). Field length is followed by a reserved area having a data length of 32 bits, followed by field number_of_mobjs. Field number_of_mobjs represents the number of movie objects contained according to a for loop statement that follows. Value mobj_id used as a loop variable of the for loop statement identifies a movie object. Value mobj_id starts with 0. Movie objects are defined in the order of which they are contained in the for loop statement.

Block TerminalInfo( ) of the for loop statement contains fields that have a data length of one bit each. These fields contain fixed value "1", fixed value "0", and fixed value "0". These fields are followed by a reserved area having a data length of 13 bits, followed by field number_of_navigation_commands[mobj_id]. Field number_of_navigation_commands[mobj_id] represents the number of navigation commands (navigation_command) contained in movie object MovieObject[mobj_id]( ) represented by value mobj_id.

Field number_of_navigation_commands[mobj_id] is followed by a for loop statement having a loop variable of value command_id. The for loop statement contains navigation commands corresponding to a value represented in field number_of_navigation_commands[mobj_id]. In other words, field navigation_command[mobj_id][command_id] contained in the for loop statement contains navigation commands of navigation_command in the order represented by value command_id contained in block MovieObject[mobj_id] represented by value mobj_id. Value command_id is a value that starts with 0. Navigation commands of navigation_command are defined in the order contained in the for loop statement.

Next, block ExtensionData( ) defined to extend the BD-ROM standard for recordable record mediums will be described. As described above, block ExtensionData( ) can be placed in file "index.bdmv", which contains an index table, file "xxxxx.mpls", which contains a play list, and clip information file "zzzzz.clpi". According to this embodiment of the present invention, block ExtensionData( ) of file "index.bdmv" is used.

FIG. 13 shows a syntax representing an exemplary structure of block ExtensionData( ). Field length has a data length of 32 bits and represents the data length immediately after field length to the end of block ExtensionData( ) as the relative number of bytes. When the data length of field length is not "0", field length is followed by an if statement.

Field data_block_start_address has a data length of 32 bits and represents the start address of block data_block( ) containing an entity of extension data ext_data in the syntax as the number of relative bytes from the beginning of block ExtensionData( ). In other words, the relative number of bytes starts with "0". Field data_block_start_address should satisfy the following 32-bit alignment condition.

data_block_start_address % 4=0

Field number_of_ext_data_entries has a data length of 8 bits and represents the number of entries of extension data contained in block data_block( ) of block ExtensionData( ). Entries of extension data contain information necessary to obtain an entity of extension data. More specifically, entries of extension data are block ext_data_entry( ) composed of for example field ID1, field ID2, field ext_data_start_address, and field ext_data_length. In block ExtensionData( ), there are blocks of ext_data_entry( ) corresponding to the value of field number_of_ext_data_entries of block ExtensionData( ).

Field ID1 has a data length of 16 bits and denotes that extension data contained in block ExtensionData( ) are extension data used for a recording apparatus. The value of field ID1 is a first value that identifies extension data. The value of field ID1 can be defined such that a licenser of specifications including block ExtensionData( ) can assign the value of field ID1. Field ID2 is a second value that identifies extension data. Field ID2 can be defined such that it represents a version number of the extension data. Block ExtensionData( ) should not contain two or more ext_data_entry( )'s whose fields ID1 and ID2 have the same values.

Field ext_data_start_address has a data length of 32 bits and represents the start address of extension data ext_data corresponding to an entry (block ext_data_entry( )) of extension data that contain field ext_data_start_address. Field ext_data_start_address represents the start address of extension data ext_data as the relative number of bytes from the beginning of block ExtensionData( ). Field ext_data_start_address should satisfy the following 32-bit alignment condition.

ext_data_start_address % 4=0

Field ext_data_length has a data length of 32 bits and represents the data length of extension data ext_data corresponding to an entry (block ext_data_entries( )) of extension data that contain field ext_data_start_address. The data length is represented as the number of bytes.

When entries (blocks of ext_data_entry( )) of extension data are contained corresponding to the value represented by field number_of_ext_data_entries, two fields of padding_word having a data length of 16 bits and containing any data sequence are repeated as pairs the number of times L1. Fields of padding_word are followed by block data_block( ) that contains an entity of extension data. Block data_block( ) contains at least one entry of extension data ext_data. Each entry of extension data ext_data is extracted from block data_block( ) based on field ext_data_start_address and field ext_data_length.

Figure 14:
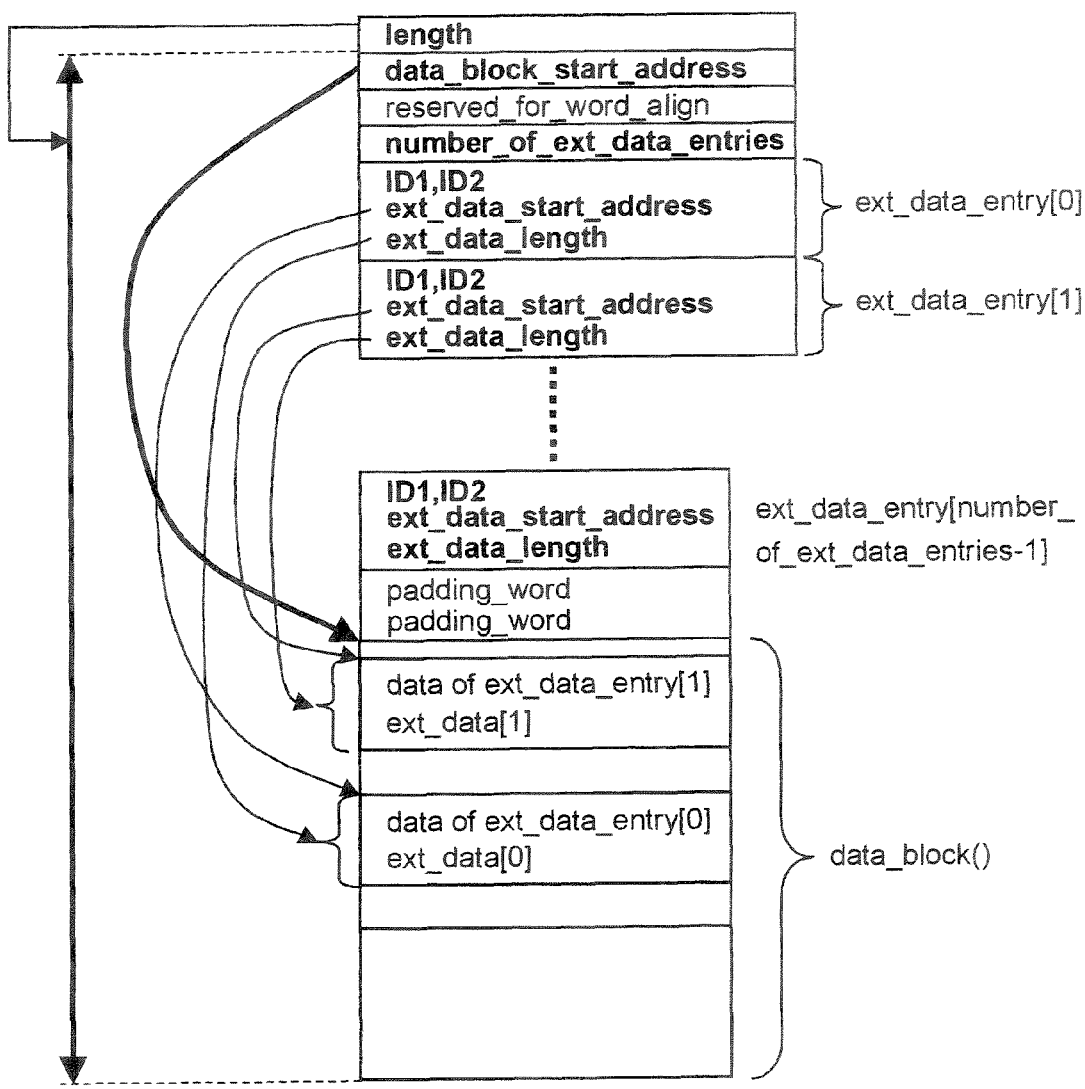
FIG. 14 is a schematic diagram showing a reference relationship of each piece of data of block ExtensionData( )

FIG. 14 schematically shows a relationship of which each data entry of block ExtensionData( ) is referenced. Field length represents the data length immediately after field length to the end of block ExtensionData( ). Field data_block_ start_address represents the start position of block data_block( ). Blocks of ext_data_entry are contained corresponding to the value represented by field number_of_ext_data_entries. Field padding_word having any length is placed between block ext_data_entry as the last block and block data_block( ).

Block data_block( ) contains extension data ext_data represented by block ext_data_entry( ). The position and data length of each entry of extension data ext_data are represented by field ext_data_start_address and field ext_data_length in the corresponding block of ext_data_entry( ). Thus, the order of entries of extension data ext_data in block data_block( ) may not match the order of corresponding entries of ext_data_entry( ).

Since extension data are composed of two layers of block data_block( ), which contains an entity of extension data, and block ext_data_entry( ), which contains access information for extension data of block data_block( ) and so forth, a plurality of entries of extension data can be contained.

Figure 15:
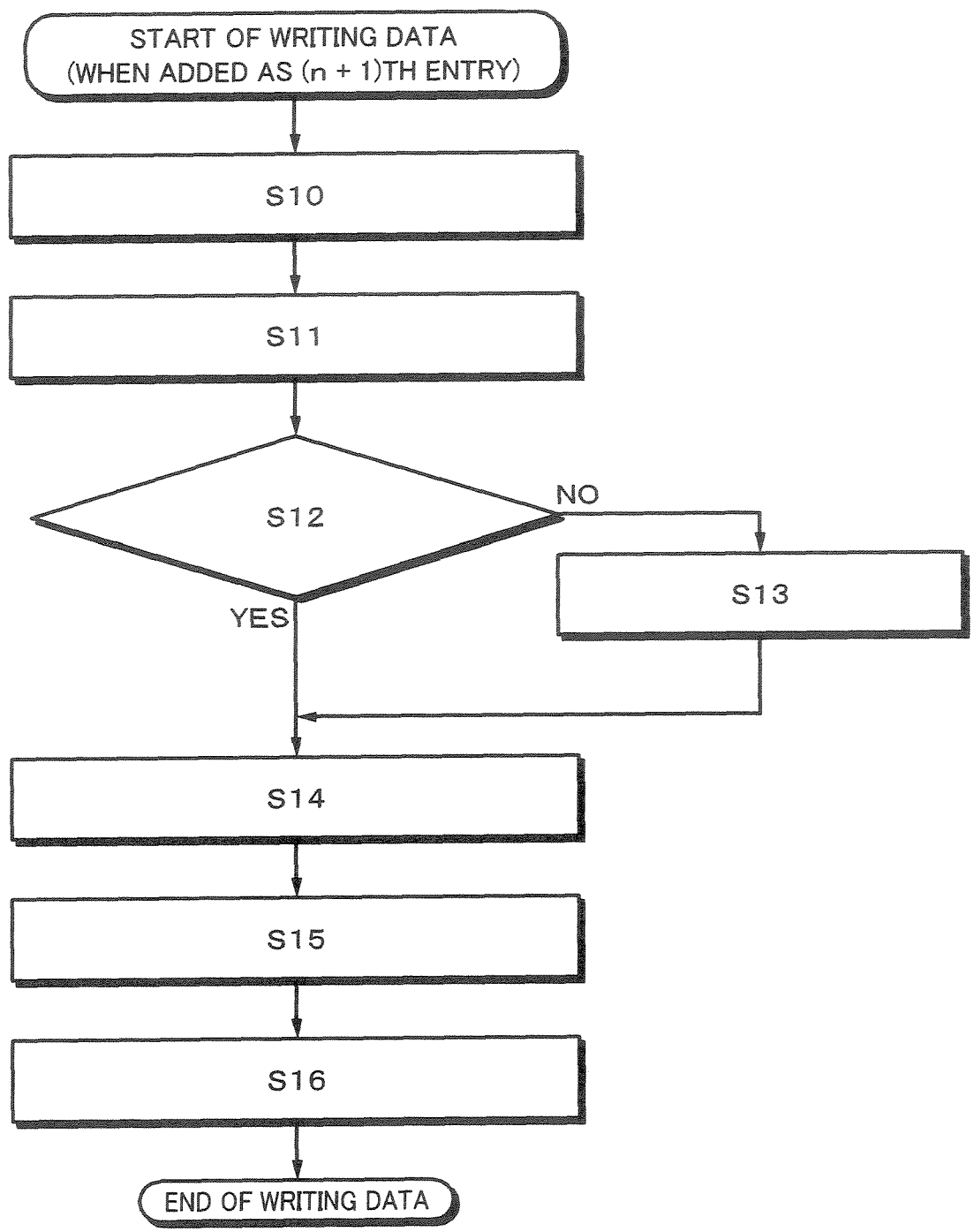
FIG. 15 is a flow chart showing an exemplary process of writing data to block ExtensionData( )

Next, a method of creating the foregoing extension data and a method of reading the extension data will be exemplified. FIG. 15 is a flow chart showing an exemplary process of writing data to block ExtensionData( ). FIG. 15 shows an example of which extension data are added as an (n+1)-th entry of block ExtensionData( ) to rewrite block ExtensionData( ).

First of all, at step S10, the data length of extension data to be written is obtained and the obtained value is set to the value of field ext_data_length[n+1]. "[n+1]" corresponds to an (n+1)-th entry number. Next, at step S11, the values of field ext_data_length and field ext_data_start_address of each block of ext_data_entry( ) of the current block of ExtensionData( ) are checked. As a result, the use state of block data_block( ) is obtained.

Next, at step S12, it is determined whether or not block data_block( ) has a successive blank area equal to or larger than the data length represented by field ext_data_length[n+1], which is the data length of extension data to be written. When the determined result denotes that block data_block( ) has such a successive blank area, the flow advances to step S14.

In contrast, when the determined result denotes that block data_block( ) does not have such a successive blank area, the flow advances to step S13. At step S13, by increasing the value of field length of block ExtensionData( ), a successive blank area equal to or larger than the data length represented by field ext_data_length[n+1] is formed in block data_block( ). After the blank area has been formed, the flow advances to step S14.

At step S14, the start address of an area to which extension data are written is decided and the value of the start address is specified as field ext_data_start_address[n+1]. Next, at step S15, extension data ext_data[n+1] having the length represented by field ext_data_length[n+1] that has been set at step S10 is written from field ext_data_start_address[n+1].

After data have been written, flow advances to step S16. At step S16, field ext_data_length[n+1] and field ext_data_start_address[n+1] are added to block ext_data_entry( ).

In the foregoing, it is assumed that block ExtensionData( ) to be rewritten has been read from a record medium such as a disc and then stored in a memory of a recording apparatus. Thus, due to a change of the value of field length at step S13, block ExtensionData( ) is increased by the system. In other words, the system properly reallocates the memory of the recording apparatus.

Figure 16:
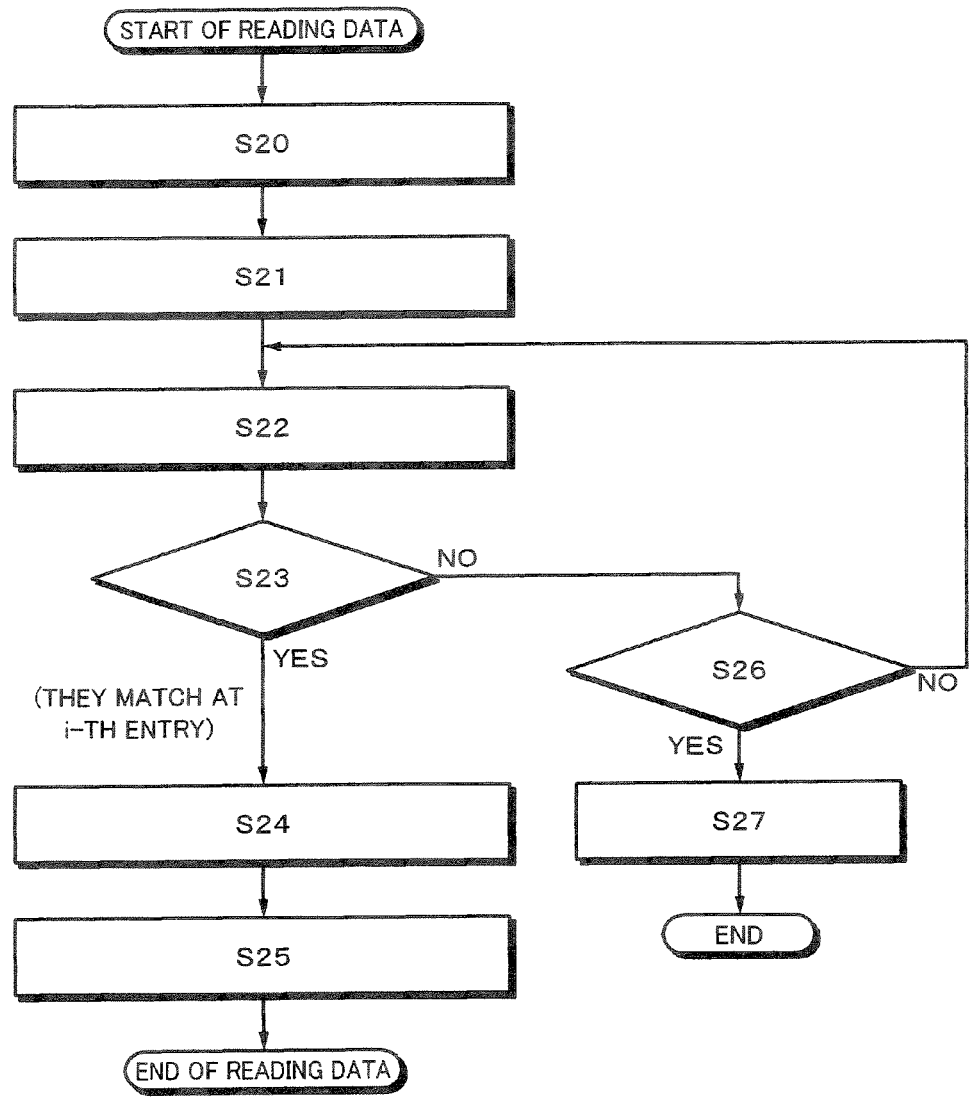
FIG. 16 is a flow chart showing an exemplary process of reading extension data from block ExtensionData( )

FIG. 16 is a flow chart showing an exemplary process of reading extension data from block ExtensionData( ). The process shown in the flow chart of FIG. 16 is applicable both to a reproduction-only record medium (for example, a BD-ROM) and a recordable record medium (for example, a BD-RE).

First of all, at step S20, the value of field ID1 is obtained from the standard on which extension data to be read are based. Next, at step S21, the value of field ID2 is obtained from the type of extension data to be read.

Next, at step S22, blocks of ext_data_entry( ) are successively read from block ExtensionData( ). At step S23, it is determined whether or not the values of field ID1 and field ID2 contained in block ext_data_entry( ) that has been read match the values of field ID1 and field ID2 obtained at step S20 and step S21, respectively.

When the determined result denotes that they do not match, the flow advances to step S26. At step S26, it is determined whether or not all blocks of ext_data_entry( ) of block ExtensionData( ) have been read. When the determined result denotes that all the blocks have been read, the flow advances to step S27. At step S27, it is determined that block ExtensionData( ) do not contain extension data to be read and the process is completed. When the determined result denotes that all the blocks have not been read, the flow returns to step S22. At step S22, the next block of ext_data_entry( ) is read from block ExtensionData( ).

When the determined result at step S23 denotes that the values of field ID1 and field ID2 of block ext_data_entry( ) match the values of field ID1 and field ID2 that have been obtained, the flow advances to step S24. In this example, it is assumed that they match in an [i]-th entry of block ExtensionData( ).

At step S24, the value of field ext_data_length[i] and the value of field ext_data_start_address[i] are read from the [i]-th entry of block ext_data_entry( ). Next, at step S25, data are read from the address represented by field ext_data_start_address[i] that has been read at step S24 for the data length represented by field ext_data_length[i].

Next, an embodiment of the present invention will be described. According to the present invention, information that represents a title to which a play list first belonged is added to the play list. This information does not change regardless of whether or not the title was edited. When such information is defined, a menu structure has compatibility between a system that stores title numbers regardless of whether or not titles were edited and a system that stores the order of which titles were recorded when they were edited and changes the title numbers as the titles are edited.

Information that represents a title to which this play list first belonged is defined as attribute information of the play list in extension data placed in file "index.bdmv" and contained in block TableOfPlayLists( ) in field ExtensionData( ) of file "index.bdmv". FIG. 17 shows a syntax of an exemplary structure of block data_block( ) (see FIG. 13) of field ExtensionData( ) of file "index.bdmv". The play list attribute is contained in block data_block( ). In the example shown in FIG. 17, block data_block is represented as block IndexExtensioinData( ).

In FIG. 13, value "0x1000" and value "0x0100" are set to field ID1 and field ID2, respectively, of block Extension Data( ). The values of field ID1 and field ID2 are identified for example by referencing a table pre-stored in a ROM (Read Only Memory) of the reproducing apparatus side. Block IndexExtensionData( ) is stored in an area represented by field ext_data_start_address and field ext_data_length of block data_block( ). In these values, "0x" represents hexadecimal notation.

In block IndexExtensionData( ), field type_indicator contains a character string that represents the type of data that follow and that is composed of four characters encoded according to an encoding system defined in the ISO 646. In the example shown in FIG. 17, four-character string "IDEX" encoded according to the known system of the ISO 646 is contained in field type_indicator. Character string "IDEX" denotes that the type of data that follow is "IndexExtensionData".

Field type_indicator is followed by a reserved area having a data length of 32 bits. The reserved area is followed by field TableOfPlayerLists_start_address having a data length of 32 bits. Field TableOfPlayLists_start_address represents the start address of block TableOfPlayLists( ) based on the beginning of block IndexExtensionData( ).

Field TableOfPlayLists_start_address is followed by field MakersPrivateData_start_address having a data length of 32 bits. Field MakersPrivateData_start_address represents the start address of block MakersPrivateData( ) based on the beginning of block IndexExtensionData( ). Field MakersPrivateData_start_address is followed by a reserved area having a data length of 192 bits, followed by block UIAppInfoHDAVC( ). Block UIAppInfoHDAVC( ) is followed by padding word padding_word having a data length of 16 bits, followed by block TableOfPlayLists( ). Block TableOfPlayLists( ) is followed by padding word padding_word having a data length of 16 bits, followed by block MakersPrivateData( ).

Since block UIAppInfoHDAVC( ) and block MakersPrivateData( ) less relate to the present invention, their description will be omitted.

FIG. 18 shows a syntax that represents an exemplary structure of the foregoing block of TableOfPlayLists( ). Field length has a data length of 32 bits and represents the data length immediately after field length to the last byte of block TableOfPlayLists( ). Field number_of_PlayLists has a data length of 16 bits and represents the number of play lists. In other words, field number_of_PlayLists represents the total number of play lists that exist on the disc.

According to the next for loop statement, field PlayList_file_name, field PlayList_attribute, and field title_id_ref are contained the number of times represented by field number_of_PlayLists. In other words, one loop represented by the for loop statement corresponds to one play list. Information about a play list composed of the file name of the play list, the attribute of the play list, and the reference title ID of the play list is contained.

The play lists are arranged in the for loop statement in the order of which they were recorded. In other words, when one play list is added, the value of field number_of_PlayLists is increased by 1. Information about the added play list is contained after the end of information about existing play lists.

Field reserved_for_future_use having a data length of 6 bits and field reserved_for_future_use having a data length of 16 bits are reserved areas for future use.

Field PlayList_file_name contains the file name of the play list that has been encoded according to the encoding system defined in the ISO 646. Field Playlist_attribute represents the attribute assigned to the play list. Based on the purpose of creating a play list, it is categorized as a first type for a play list created when a clip is created, a second type for a play list created using a part or all of existing titles or play lists, and a third type of which a play list is used to reproduce a menu. Each play list is assigned attribute "Real" (first type), attribute "Virtual" (second type), or attribute "Menu" (third type) depending on the type of the play list.

It can be contemplated that the type of a play list is categorized based on the cause of the creation.

In the following description, for convenience, a play list assigned attribute "Real" is referred to as a real play list. A play list assigned attribute "Virtual" is referred to as a virtual play list. A play list assigned attribute "Menu" is referred to as a menu play list.

Field title_id_ref contains the ID (number) of the title to which the play list represented by field PlayList_file_name of the same loop. As a more specific example, field title_id_ref contains value title_id of block Indexes( ) of index file "index.bdmv". When the play list is not reproduced as a title, but as a first playback only, the value of field title_id_ref is a first fixed value, for example "0xFFFF". When the play list is not reproduced as a title, but as a top menu, the value of field title_id_ref is a second fixed value, for example "0xFFFE".

Next, an exemplary process of editing a menu according to an embodiment of the present invention will be described. In this embodiment of the present invention, by applying the following restrictions to the BD-ROM standard extended to recordable record mediums, a menu is edited.

The following restrictions are applied to a relationship of titles, movie objects, and play lists. In this example, a "title" is a title selected on the top menu and the selected title is reproduced.
(A) A play list used to reproduce a top menu is independent from a play list used to reproduce a regular title.
(B) Each title is a movie title. In other words, each title should not be an interactive title.
(C) Each title is composed of one play list through one movie object.

In addition, with respect to the order of which titles and play lists are arranged, the following restrictions are applied.
(D) Play lists are arranged in block TableOfPlayLists( ) in the order of which they were recorded.
(E) Play lists reproduced from each title are decided according to the arrangement of the titles in block Indexes( ) of file "index.bdmv" and the arrangement of play lists in block TableOfPlayLists( ) excluding those that compose the first playback and the top menu.

The restriction (A) "A play list used to reproduce a top menu is independent from a play list used to reproduce a regular title.", the restriction (B) "Each title is a movie title. In other words, each title should not be an interactive title.", and the restriction (C) "Each title is composed of one play list through one movie object." are those that allow a menu editing process to be easily performed.

In other words, according to these restrictions (A), (B), and (C), a play list used to reproduce a menu is clearly separated from a play list that composes a title called from the menu. In addition, play lists, movie objects, and titles are referenced in a relationship of 1:1:1. For example, each title references one movie object. Each movie object calls one play list. For example, a navigation command contained in a movie object specifies one play list file and causes the specified play list file to be reproduced.

A menu editing method based on these restrictions (A), (B), and (C) is as follows. Now, it is assumed that a clip is added to a disc on which a plurality of titles have been recorded and a title with which the recorded clip is reproduced is added to the menu. First, a clip list corresponding to the newly recorded clip is created. Attribute "Real" is added to the created play list. It means that the created play list is a real play list. Next, a movie object that calls the real play list is created. A link to the movie object is contained in an index table. As a result, a title is created.

Next, the existing menu is deleted. In other words, a play list (menu play list) and a movie object used to reproduce the menu are deleted. The top menu and the first playback are deleted from the index table. Since the menu play list and movie object used to reproduce the menu are clearly separated from those that compose a title, the menu play list and movie object used to reproduce the menu can be easily deleted.

Play lists and movie objects used to reproduce the menu are newly created based on the existing titles and the added title. In addition, the top menu and the first playback are contained in the index table. Since play lists, movie objects, and titles are referenced in a relationship of 1:1:1, movie objects and play lists used to reproduce the menu can be easily created based on the existing titles and the added title.

Thus, based on the restrictions (A), (B), and (C), a menu can be very easily updated according to an added title.

The restriction (D) "Play lists are arranged in block TableOfPlayLists( ) in the order of which they were recorded." and the restriction (E) "Play lists reproduced from each title are decided according to the arrangement of the titles in block Indexes( ) of file "index.bdmv" and the arrangement of play lists in block TableOfPlayLists( ) excluding those that compose the first playback and the top menu." are restrictions that allow the system that stores title numbers regardless of whether titles were edited to have compatibility with the system that stores the order of which titles were recorded when they were edited and changes the title numbers as the titles are edited.

When a title is recorded to a recordable record medium, it is contemplated that it is assigned a title number in the order of which the title was recorded. Thus, according to the restriction (D), all play lists referenced from a movie object are arranged in block TableOfPlayLists( ) in the order of which they were recorded. As a result, when the order of play lists arranged in block TableOfPlayLists( ) is checked, the order of which the titles were recorded can be restored.

For example, it can be contemplated that block Indexes( ) of the top menu or the index table is deleted as a title has been edited depending on the specifications of the recorder. According to the restriction (D), in such a case, when block TablePlayLists( ) is referenced, the order of which titles were recorded can be restored.

However, according to only the restriction (D), although the order of which titles were recorded is stored, title numbers are not stored. Depending on the specifications of the recorder, it can be contemplated that after titles have been edited, title numbers assigned when the titles were recorded need to be stored and the title numbers that were not changed need to be provided to the user. The restriction (E) solves the problem about compatibility of the title management between recorders. According to the restriction (E), information about title numbers is stored on the play list side, not the title side. Thus, even if block Indexes( ) is deleted for example from an index table, information about title numbers of titles that were recorded is not lost.

In other words, by correlating the value of field title_id of block Indexes( ) and the value of field title_id_ref of block TableOfPlayLists( ), a play list to be reproduced is decided. When the recorder uses title numbers of titles that were recorded, the player composes a menu screen and reproduces a play list based on field title_id_ref. When the recorder stores the order of which titles were recorded, the player composes a menu screen and reproduces a play list based on field title_id.

Figure 19:
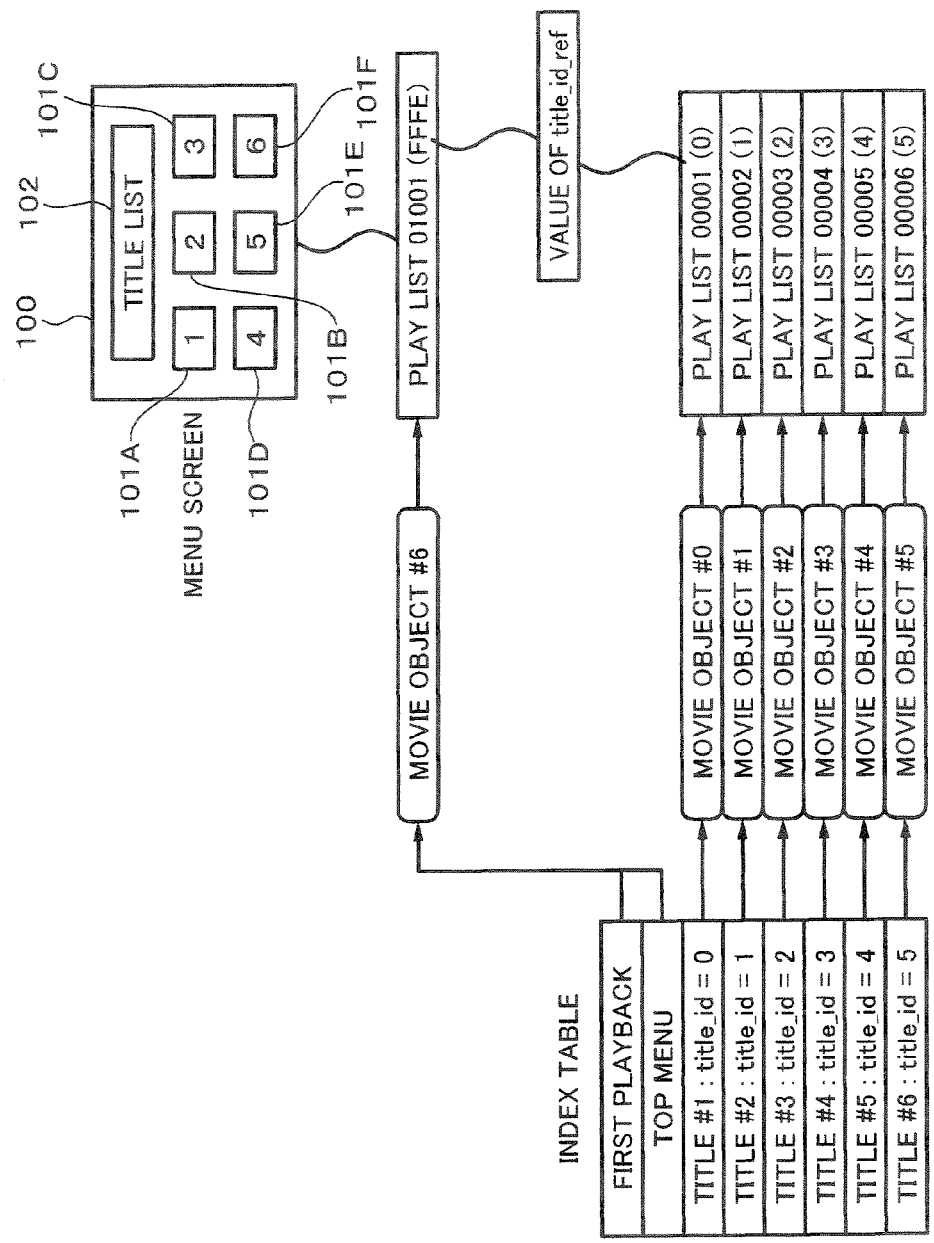
FIG. 19 is a schematic diagram showing a menu screen that has not been edited and an exemplary structure of titles, movie objects, and play lists that relate to the menu screen.

Next, with reference to FIG. 19 to FIG. 21, a menu editing process according to an embodiment of the present invention will be described more specifically. FIG. 19 shows a menu screen 100 that has not been edited and an exemplary structure of titles, movie objects, and play lists that relate to the menu screen 100. In the example shown in FIG. 19, it is assumed that six titles #1 to #6 have been recorded on the disc. As was described with reference to FIG. 10, each title is registered as field Title[title_id] identified by value title_id used as a loop variable in block Indexes( ) of file "index.bdmv". Field Title_mobj_id_ref[title_id] references a movie object. It is assumed that a title number is defined as a value of which 1 is added to value title_id. A movie object is stored in the order of value title_id in file "MovieObject.bdmv". A movie object contains information of a play list to be reproduced.

Play lists are assigned file names "00001.mpls", "00002.mpls", "00003.mpls", "00004.mpls", "00005.mpls", and "00006.mpls" for example in the order of which the play lists were created and stored below directory "PLAYLIST".

According to the restriction B, "Each title is a movie title. In other words, each title should not be an interactive title.", each title calls one movie object. In addition, according to the restriction C, "Each title is composed of one play list through one movie object.", each movie object references one play list. In other words, titles, movie objects, and play lists have a relationship of 1:1:1.

In the example shown in FIG. 19, value title_id is 1. A title having title number #2 references only movie object #1 corresponding to value title_id. Movie object #1 references only a play list having file name "00002.mpls". In this example, the play list having file name "00002.mpls" is a virtual play list assigned attribute "Virtual". A title having title number #3 references only movie object #2 corresponding to value title_id. In this example, movie object #2 references only a play list having file name "00003.mpls". The play list having file name "00003.mpls" is a real play list assigned attribute "Real". The play lists and clips have a relationship of 1:1.

A menu screen on which the user commands the player to reproduce a title recorded on the disc is reproduced based on a first playback and a top menu contained in the index table. A movie object referenced to reproduce the menu screen is contained in field FirstPlayback_mobj_id_ref of block FirstPlayback( ) of block Indexes( ) of file "index.bdmv" and field TopMenu_mobj_id_ref of block Topmenu( ). In the example shown in FIG. 19, these fields, FirstPlayback_mobj_id_ref and topMenu_mobj_id_ref reference the same movie object, #6.

Movie object #6 references a menu play list to actually reproduce the menu screen. In the example shown in FIG. 19, movie object #6 references a play list assigned attribute "Menu" and having file name "01001.mpls".

A play list used to reproduce the menu screen is assigned attribute "Menu". A movie object referenced from the first playback and the top menu references only a menu play list assigned attribute "Menu". A movie object referenced from the first playback and the top menu does not reference each title called from the top menu and a movie object referenced from each title. Thus, the restriction A, "A play list used to reproduce a top menu is independent from a play list used to reproduce a regular title.", can be accomplished.

In addition, a clip referenced from the menu play list is independent from a clip referenced from a play list corresponding to each title called from the top menu.

In the pre-editing state, the values of fields of title_id_ref in block TableOfPlayLists( ) for play lists having file names "00001.mpls", "00002.mpls", "00003.mpls", "00004.mpls", "00005.mpls", and "00006.mpls" are 0, 1, 2, 3, 4, and 5, respectively. The value of field title_id_ref of a play list having file name "01001.mpls" referenced by the first playback and the top menu through movie object #6 is "0xFFFE" that denotes that the play list is reproduced from the top menu.

In the following description, for simplicity, "the value of field title_id_ref in block TableOfPlayLists( )" is abbreviated as "value title_id_ref".

In FIG. 19, a play list referenced from the first playback and the top menu through movie object #6 causes the menu screen 100 to be displayed. In the example shown in FIG. 19, buttons 101A to 101F with which six titles are reproduced are displayed with predetermined button image data on the menu screen 100. In addition, a menu title 102 of the menu screen 100 is displayed.

When the button 101A is selected in a predetermined manner, a title of which the value of title_id is 0 and title number is #1 is specified. As a result, movie object #0 is referenced. With a navigation command contained in movie object #0, a play list having file name "00001.mpls" is referenced and the play list is commanded to be reproduced. As a result, a clip corresponding to the play list is reproduced.

It is contemplated that a title is deleted in the state shown in FIG. 19. In addition, it is assumed that a system that stores the order of which titles were recorded when they were edited and changes title numbers as the titles are edited.

Figure 20:
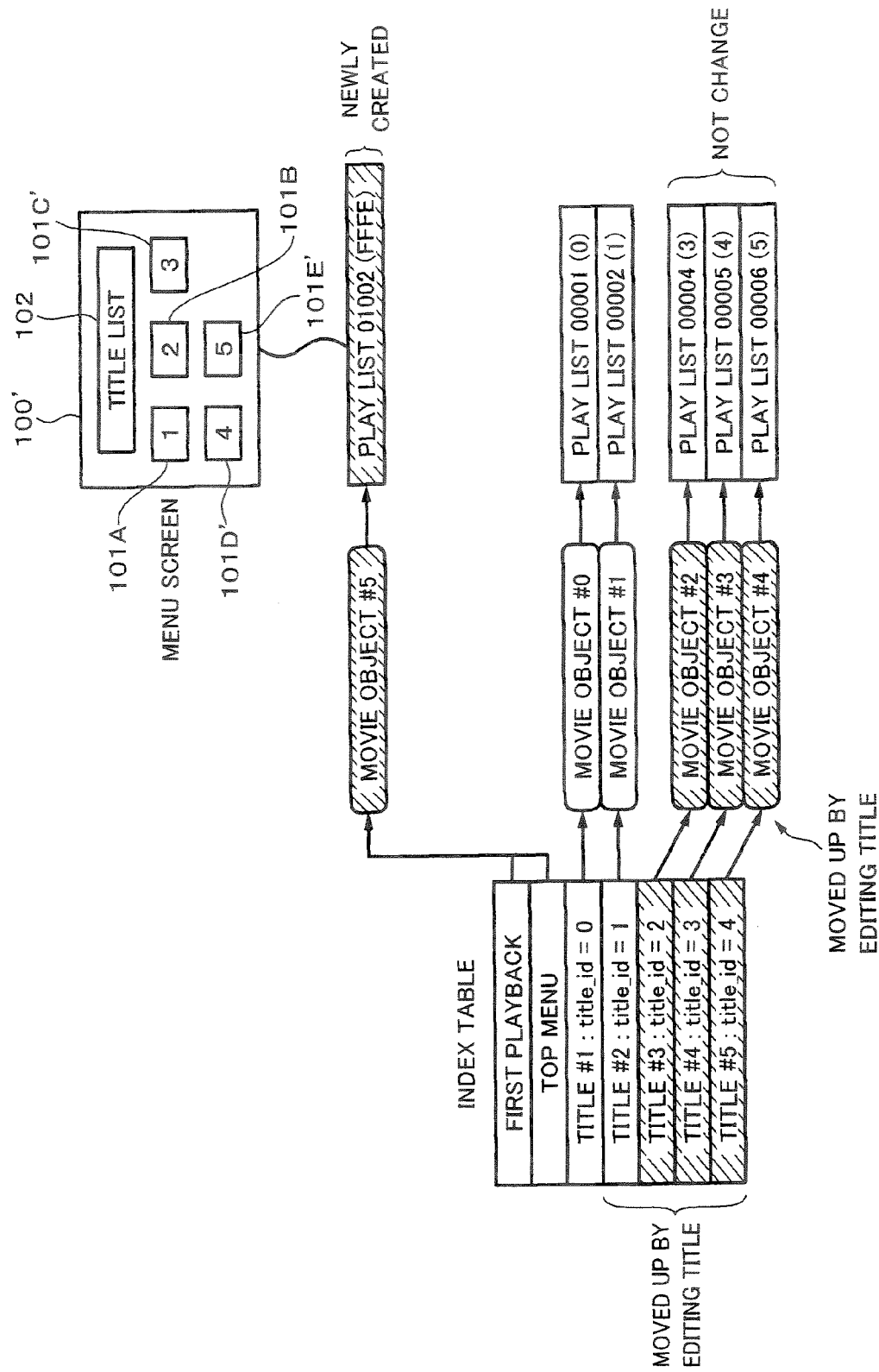
FIG. 20 is a schematic diagram showing a menu screen from which title #3 was deleted and an exemplary structure of titles, movie objects, and play lists that relate to the menu screen.

FIG. 20 shows a menu screen 100' and an exemplary structure of titles, movie objects, and play lists of the title #3 that relate to the menu screen 100' in the case that a title of which value title_id is 2 and the title number is 3 has been deleted from the state shown in FIG. 19. Since the title having title number #3 has been deleted from the state shown in FIG. 19, each of the pre-edited title numbers is decreased by 1 after pre-edited title number #3. In addition, movie object #3 called from the title having pre-edited title number #3 is deleted. Each of movie object numbers is decreased by 1 after movie object #3 called from pre-edited title number #3. At this point, since the contents of the movie objects whose numbers changed do not change before and after the title is edited, play lists referenced from movie objects do not change before and after the title is edited. A play list (file name "00003.mpls") referenced from the movie object that was deleted is deleted.

Next, a specific example of the process will be described. With reference to FIG. 9 and FIG. 10, when the title having title number #3 is deleted, block Title[title_id=2]( ) whose value title_id is 2 is deleted from the for loop statement with a loop variable of value title_id in block Indexes( ) of index file "index.bdmv". Since the number of blocks of Title[title_id]( ) is decreased by 1, the value of field number_of_Titles is correspondingly decreased by 1. Thus, each of title numbers of titles after the deleted title is decreased by 1.

In addition, since block Title[title_id=2]( ) in block Indexes( ) is deleted, a movie object referenced from block Title[title_id=2]( ) based on the value of field Title_mobj_id_ref[title_id=2] is also deleted. With reference to FIG. 11 and FIG. 12, block MovieObject[mobj_id]( ) corresponding to the value of field Title_mobj_id_ref[title_id=2] is deleted from the for loop statement with a loop variable of block MovieObject( ) in block MovieObjects( ) of file "MovieObject.bdmv". In this example, since titles and movie objects have a relationship of 1:1, block MovieObject[mobj_id=2]( ) of which value mobj_id is 2 is deleted. Since the number of blocks of MovieObject[mobj_id]( ) is decreased by 1, the value of field number_of_mobjs is correspondingly decreased by 1. Thus, the movie object called from the title having title number #3 that has been deleted is deleted. Each of the movie objects is successively moved up without changes of contents of movie objects after the deleted movie object. Since the contents of movie objects do not change, a relationship of movie objects and play lists does not change.

In addition, a play list referenced from the movie object that has been deleted is deleted. At this point, when the attribute of the play list that is deleted is "Real", a clip corresponding to the play list is also deleted. When the play list is deleted, an entry corresponding to the file name of the play list is deleted from the for loop statement of block TableOfPlayLists( ) in extension data block ExtensionData( ) of index file "index.bdmv". As a result, the value of field number_of_PlayLists is decreased by 1.

As the title has been deleted, the menu is updated. The menu is updated by deleting the pre-edited menu and newly creating a menu based on information of the title. More specifically, information about a play list assigned attribute "Menu" is retrieved from field PlayList_attribute of block TableOfPlayLists( ). The retrieved play list is deleted. In the example shown in FIG. 19, a play list having file name "01001.mpls" is deleted. In addition, a movie object (movie object #6 in the example shown in FIG. 19) that is called from the top menu and the first playback is deleted on the basis of block Indexes( ) of index file "index.bdmv". In addition, the top menu and the first playback are deleted from the index table.

After the pre-edited menu has been deleted, a menu according to the edited result is created. For example, clips, movie objects, and play lists used to reproduce a menu screen 100, as a post-edited top menu are created. For example, the following process is performed.

First, clips used to display the menu screen 100' are created. In the example shown in FIG. 20, the new menu screen 100' is composed of the button images of the pre-edited menu screen 100 shown in FIG. 19. On the menu screen 100', five buttons 101A, 101B, 101C', 101D', and 101E' corresponding to title numbers #1, #2, #3, #4, and #5 are displayed. The created data are multiplexed in a predetermined manner and recorded as a clip AV stream file on the disc.

Next, a clip information file corresponding to the clip AV stream file is created. In addition, a play list that references the clip information file is created. The file name of the play list is decided such that it does not overlap with those of existing play lists and those of play lists that existed. In this example, it is contemplated that the file name of the play list is "01002.mpls".

When the play list has been created, a movie object that references the play list is created. As described above, the movie object is added to the for loop statement in block MovieObjects( ) of file "MovieObject.bdmv". Thus, the movie object is movie object #5 preceded by movie object #4 referenced from a title having the largest title number.

Movie object #5 used to reproduce the top menu is registered to block TopMenu( ) of block Indexes( ) of index file "index.bdmv". In other words, with reference to FIG. 10, data that represent movie object #5 are contained as field TopMenu_mobj_id_ref of block TopMenu( ). In addition, block FirstPlayback( ) of block Indexes( ) of index file "index.bdmv" is updated. In other words, in block FirstPlayback( ), the value of field HDAVC_Title_playback_type is a predetermined value and data that represent movie object #5 used to reproduce the top menu is contained as field FirstPlayback_mobj_id_ref.

Block TableOfPlayLists( ) of extension data block ExtensionData( ) of index file "index.bdmv" is updated. In this example, in block TableOfPlayLists( ), the value of field number_of_PlayLists is decreased by 1. The file name of the play list that composes the top menu and that has been newly created is contained as field PlayList_file_name in block TableOfPlayLists( ). The play list is assigned attribute "Menu". The value that represents attribute "Menu" is contained as field PlayList_attribute. When the play list is assigned attribute "Menu" and is referenced from the top menu, the value of field title_id_ref is fixed, for example "0xFFE". The value of field length is updated according to the contents that have been added.

When a title is edited, file "index.bdmv", file "MovieObject.bdmv", and so forth are updated as a process that a CPU (Central Processing Unit) performs on a work memory. For example, when a disc is loaded into the recorder, it reads index file "index.bdmv" and movie object file "MovieObject.bdmv" from the disc and stores them in the work memory of the CPU. When the CPU receives a menu edit command, the CPU performs the foregoing process for the files stored in the work memory. The updated files are rewritten to the disc at predetermined timings, for example, when the disc is unloaded from the recorder or the power of the recorder is turned off.

It is contemplated that the disc recorded as shown in FIG. 20 is loaded into the recorder that stores title numbers assigned when the titles were recorded. In this case, the recorder side needs to restore the title numbers of the titles that were deleted by the foregoing process. The title numbers can be restored by using information of field title_id_ref of block TableOfPlayLists( ) defined in the foregoing embodiment of the present invention.

Figure 21:
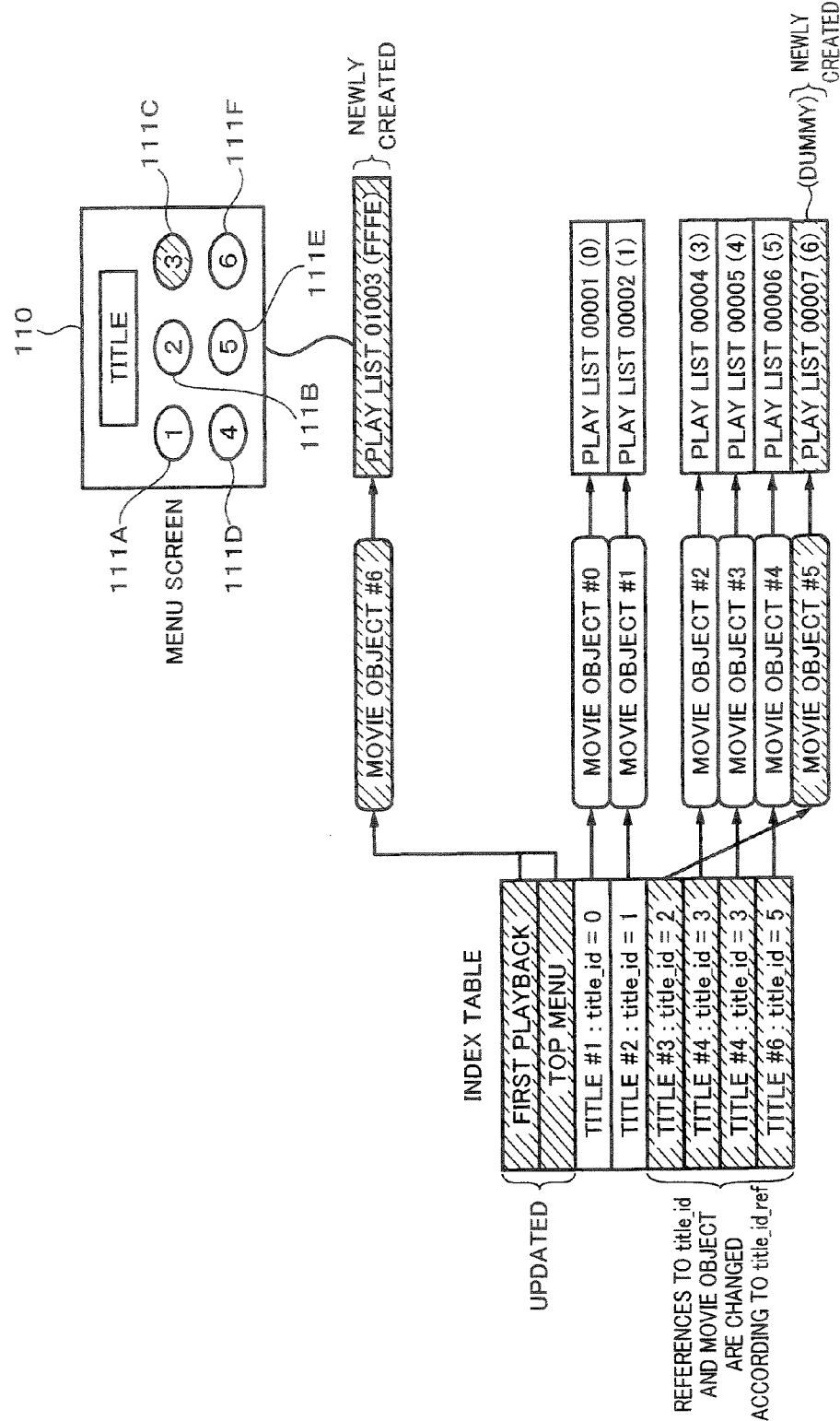
FIG. 21 is a schematic diagram showing a menu screen on which a title number has been restored and an exemplary structure of titles, movie objects, and play lists that relate to the menu screen.

FIG. 21 shows a menu screen 110 on which a title number has been restored and an exemplary structure of titles, movie objects, and play lists that relate to the menu screen 110. In the example shown in FIG. 21, on the menu screen 110, buttons 111A, 111B, 111D, 111E, and 111F corresponding to titles that have been recorded on the disc and a button 111C corresponding to a title that was recorded and has been deleted. When the button 111C is selected, it is preferred that the user be informed that the title having the title number has been deleted and does not exist on the disc.

The structure exemplified in FIG. 21 is basically created in the following manner. For example, with reference to field title_id_ref of block TableOfPlayLists( ), a title number that was deleted is restored on the basis of value title_id_ref and the restored title number is inserted into the index table. In addition, a movie object and a play list corresponding to the restored title number are created. The play list may be a dummy play list that denotes that the title of the title number has been deleted. A clip referenced from the play list may be created or may be provided by the system side whenever the play list is created.

In addition, the pre-edited menu displayed before the title number has been restored is deleted. The menu screen 110 that displays the title having the title number that has been restored is newly created. In other words, the play list and movie object used to reproduce the pre-edited menu displayed before the title number has been restored are deleted. In addition, the first playback and the top menu of the index table are deleted. A play list and a movie object are newly created. The created movie object is registered to the top menu and the first playback.

Figure 22:
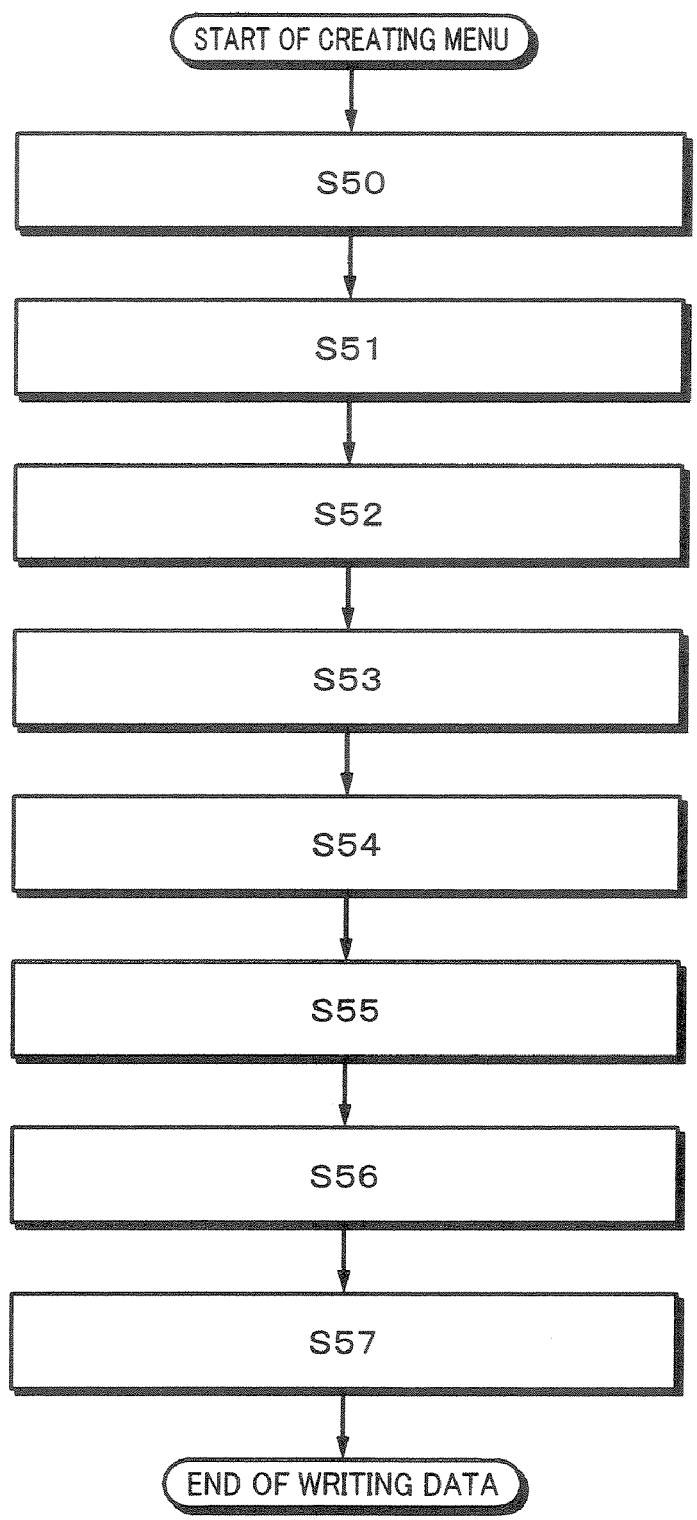
FIG. 22 is a flow chart showing a process of restoring a title number according to value title_id_ref.

FIG. 22 is a flow chart showing an exemplary process of restoring a title number, namely value title_id, based on value title_id_ref. When a title recorded on the loaded disc is edited, before performing the process of the flow chart, a recorder that stores the order of which titles were recorded, but not title numbers, (this recorder is referred to as the recorder A) deletes the title from the loaded disc. At this point, as exemplified in FIG. 20, each of title numbers is decreased by 1 after the title number of the title that was deleted. In addition, it is contemplated that the structure of which a movie object and a play list called from the title that was deleted were deleted has been recorded. This disc is loaded into a recorder that stores title numbers (this recorder is referred to as the recorder B).

When the disc is loaded into the recorder B, it reads index file "index.bdmv" and movie object file "MovieObject.bdmv". At this point, the recorder B performs for example the following operation. With reference to block TableOfPlayLists( ) of extension data block ExtensionData( ) of index file "index.bdmv", the recorder B obtains value title_id_ref for each play list. Thereafter, the recorder B determines whether or not the obtained values of title_id_ref are successive values. When the values of title_id_ref are not successive values, the recorder B can determine that the recorder A has deleted a title. When the determined result denotes that the recorder A has deleted a title, the recorder B performs the process from step S50 to step S57 such that the system implemented in the player B can have compatibility with the system implemented in the player A.

The process from step S50 to step S57 is performed by the CPU (Central Processing Unit) that controls the recorder B for file "index.bdmv" and file "MovieObject.bdmv" that has been read to the memory. Data that have been processed and stored on the memory are recorded to the disc at predetermined timings for example when the disc is unloaded from the recorder B or the power of the recorder B is turned off.

When the process of creating a menu is started, the flow advances to step S50. At step S50, with reference to block Indexes( ) of index file "index.bdmv", movie objects other than those that compose titles are deleted. For example, movie objects represented by field FirstPlayback_mobj_id_ref of block FirstPlayback( ) and field TopMenu_mobj_id_ref of block TopMenu( ) are deleted from block Indexes( ).

At step S51, with reference to field PlayList_attribute of block TableOfPlayLists( ) of extension data block ExtensionData( ) in index file "index.bdmv", a play list other than those that compose titles is deleted. For example, a play list of which field PlayList_attribute represents attribute "Menu" is deleted.

At step S52, with reference to value title_id_ref of a play list that composes each title, the contents of block Indexe( ) are rewritten such that the title number, namely value title_id, of the title used to reproduce each play list matches value title_id_ref of the corresponding play list. In other words, a play list called from a movie object to be referenced is obtained for each value of title_id of the for loop statement of block indexes( ) in index file "index.bdmv". With reference to block TableOfPlayLists( ) from extension data of the index file based on the obtained play list information, corresponding value title_id_ref is obtained. A corresponding portion of block Indexes( ) is rewritten such that value title_id_ref becomes value title_id of the reference source.

At step S52, a title that was deleted on the recorder A and whose title number is an unused number is processed. Since a title number, namely value title_id, of a title that has been stored, value title_id_ref corresponding to the title deleted by the recorder A becomes an unused number. A play list corresponding to value title_id corresponding to unused value title_id_ref is created. The play list may be for example a dummy play list. For example, the play list may be a play list that denotes that a title having a title number based on value title_id does not exist on the disc. The play list is assigned a file name that does not exist on the disc (file name "00007.mpls" in the example shown in FIG. 21) and recorded on the disc.

In addition, a movie object used to reproduce the created play list is reproduced. The created movie object is added after movie objects that exist (movie object #5 in the example shown in FIG. 21) in movie object file "MovieObject.bdmv". The added movie object number (for example, value mobj_id of block MovieObjects( ) of movie object file "MovieObject.bdmv") is set to field Title_mobj_id_ref corresponding to value title_id in block Indexes( ) of index file "index.bdmv".

At step S53, block TableOfPlayLists( ) of extension data block ExtensionData( ) in index file "index.bdmv" is updated. In other words, at step S53, information of the dummy play list created at step S52 is contained in block TableOfPlayLists( ).

More specifically, the value of field number_of_PlayLists of block TableOfPlayLists( ) is increased by 1. The file name of the dummy play list created at step S52 is contained as field PlayList_file_name. The play list is assigned for example attribute "Real". The value that represents the attribute is contained as field PlayList_attribute. Field title_id_ref is placed after the existing value of title_id_ref. In the example shown in FIG. 21, since the maximum value of existing value title_id-ref is 5, value title_id_ref corresponding to the dummy play list is 6. The value of field length is updated according to the added contents.

At step S54, a clip, a movie object, and a play list used to display the top menu are created. This process is performed as follows. First, a clip used to display the menu screen is created. For this clip, image data that have been automatically created according to a predetermined program may be used. Instead, image data for the menu screen that are prepared on the disc or recorder may be used. Image data used for the menu screen may be moving picture data or still picture data. In addition, button image data that cause the recorder to reproduce a title may be created in the same manner. In addition, a thumbnail image corresponding to a clip used for a title may be used. The data created in such a manner are multiplexed according to a predetermined system and recorded as a clip AV stream file on the disc.

Next, a clip information file corresponding to the clip AV stream file is created. In addition, a play list that references the clip information file is created. The file name of the play list is assigned such that it does not overlap with the file names of play lists that exist or those that existed. In the example shown in FIG. 21, the file name of the play list has been assigned "01003.mpls".

When the play list has been created, a movie object that references the play list is created. This movie object is the next movie object of the movie object that references the dummy play list added at step S52 (movie object #6 in the example shown in FIG. 21).

At step S55, the movie object that has been created at step S54 and that is used to reproduce the top menu is contained in block TopMenu( ) of block Indexes( ) of index file "index.bdmv". In other words, With reference to FIG. 10, data that represent the movie object are contained as field TopMenu_mobj_id_ref in block TopMenu( ).

At step S56, block FirstPlayback( ) of block Indexes( ) in index file "index.bdmv" is updated. In other words, the value of field HDAVC_Title_playback_type of block FirstPlayback( ) is a predetermined value. Value mobj_id that represents a movie object that has been created at step S54 and the is used to reproduce the top menu is contained as field FirstPlayback_mobj_id_ref.

As a play list used to reproduce the top menu has been added at step S54, at step S57, block TableOfPlayLists( ) of extension data block ExtensionData( ) of index file "index.bdmv" is updated. In other words, at step S57, information of the play list that has been created at step S54 and that is used to reproduce the top menu is contained in block TableOfPlayLists( ).

More specifically, the value of field number_of_PlayLists is increased by 1 in block TableOfPlayLists( ). The file name of the play list that has been newly created and that composes the top menu is contained as field PlayList_file_name in block TableOfPlayLists( ). The play list is assigned attribute "Menu". The value that represents attribute "Meu" is contained as field PlayList_attribute. When the play list is assigned attribute "Menu" and is referenced from the top menu, the value of field title_id_ref is a fixed value "0xFFFE". The value of field length is updated on the basis of the added contents.

In the foregoing, the process that the recorder B that stores title numbers performs in the case of which the recorder A that stores the order of which titles were recorded, but not title number, has edited a title and recorded the edited title on a disc and the disc is loaded into the recorder B was described. Of course, the reverse case can be contemplated. In this case, the recorder B that stores title numbers edits a title and records the edited title on a disc and the disc is loaded into the recorder A that does not store title numbers.

For example, it is considered that the recorder B deletes title #3 from a disc on which titles #1 to #6 were recorded. Since the recorder B stores title numbers, as title #3 is deleted, a dummy play list that denotes that title #3 was deleted is created. As described with reference to FIG. 21, as title #3 is deleted, a dummy play list and a movie object referenced from title #3 are deleted. A dummy play list and a movie object used to reproduce the dummy play list are created and added to movie objects and play lists that remain.

In the structure shown in FIG. 21, one movie object is called from a title. One play list is referenced from the movie object. Thus, the recorder A can reproduce data from the disc without any changes of titles, movie objects, and play lists.

In the foregoing, the process in the case of which one title is deleted from a plurality of titles recorded on the disc was described. Instead, an embodiment of the present invention can be applied to the case of which two or more titles are deleted from those. In other words, when two or more titles were deleted, title numbers of titles that were deleted can be obtained according to value title_id_ref. The titles having title numbers that were deleted can be restored. Movie objects and play lists corresponding to the titles that were deleted are created and the created movie objects and play lists are associated with the restored titles.

The recorder A may delete a last recorded title from a disc. In this case, values of title_id_ref are successive values and title numbers do not contain any unused numbers. Thus, when the disc is loaded into the recorder B, it is contemplated that the recorder does not have abnormality on the menu and about a title that is added.

Next, a recording and reproducing apparatus according to an embodiment of the present invention will be described. First, a virtual player will be described in brief. When a disc having the foregoing data structure is loaded into the player, the player needs to convert commands contained in a movie object or the like read from the disc into unique commands that control hardware of the player. The player pre-stores software with which such conversion is performed for commands in a ROM (Read-Only Memory) of the player. Since this software causes the player to operate in accordance with the BD-ROM standard through the disc and the player, this software is referred to as the BD virtual player.

Figures 23A, 23B:
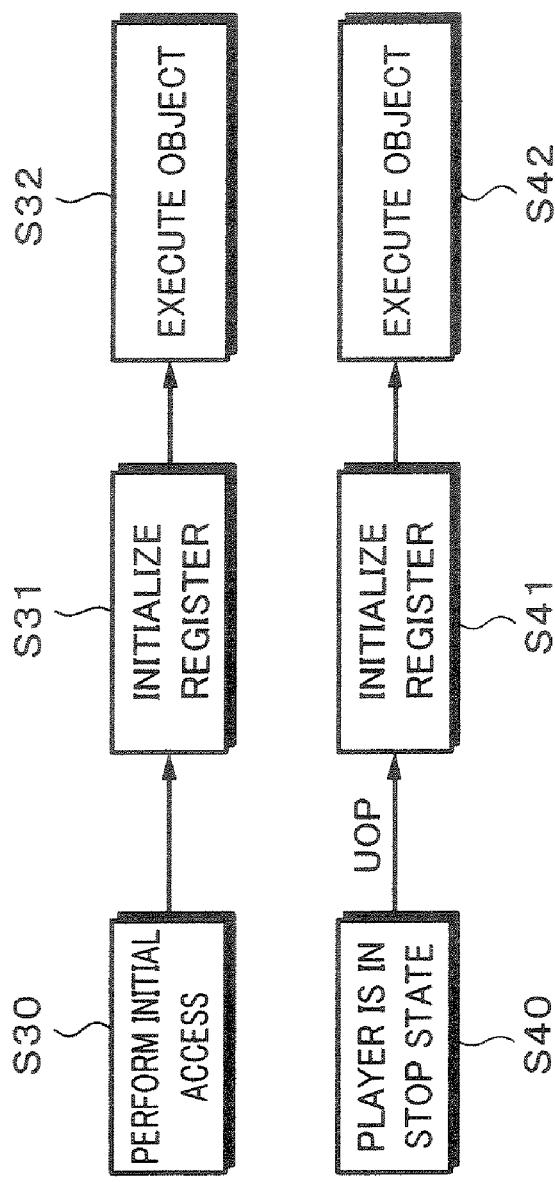
FIG. 23A and FIG. 23B are flow charts showing an outline of an operation of a BD virtual player.

FIG. 23A and FIG. 23B show the operation of the BD virtual player in brief. FIG. 23A shows an exemplary operation of which the BD virtual player loads the disc. When the disc is loaded into the player and then the disc is initially accessed (at step S30), a register that stores common parameters used for one disc is initialized (at step S31). Next, at step S32, a program contained in a movie object or the like is read from the disc and then the program is executed. The initial access denotes that data are initially reproduced from the disc as in the case that the disc is loaded.

FIG. 23B shows an exemplary operation of the player in the case that by pressing for example a play key of the player, the user commends the player to reproduce data from the disc in the stop state of the player. In the initial stop state (at step S40) the user commands the player to reproduce data from the disc for example with a remote control commander (by UO (User Operation)). When the player is commanded to reproduce data from the disc, the register, namely common parameters, is initialized (at step S41). Next, at step S42, a move object execution phase starts.

Next, with reference to FIG. 24, the reproduction of a play list in the movie object execution phase will be described. It is contemplated that by the UO or the like, the player has been commanded to start reproducing content of title #1 from the disc. When the player has been commanded to start reproducing content from the disc, the player references the index table shown in FIG. 4 and obtains an object number corresponding to the reproduction of content of title #1. Assuming that the object number corresponding to the execution of content of title #1 is #1, the player starts executing movie object #1.

Figure 24:
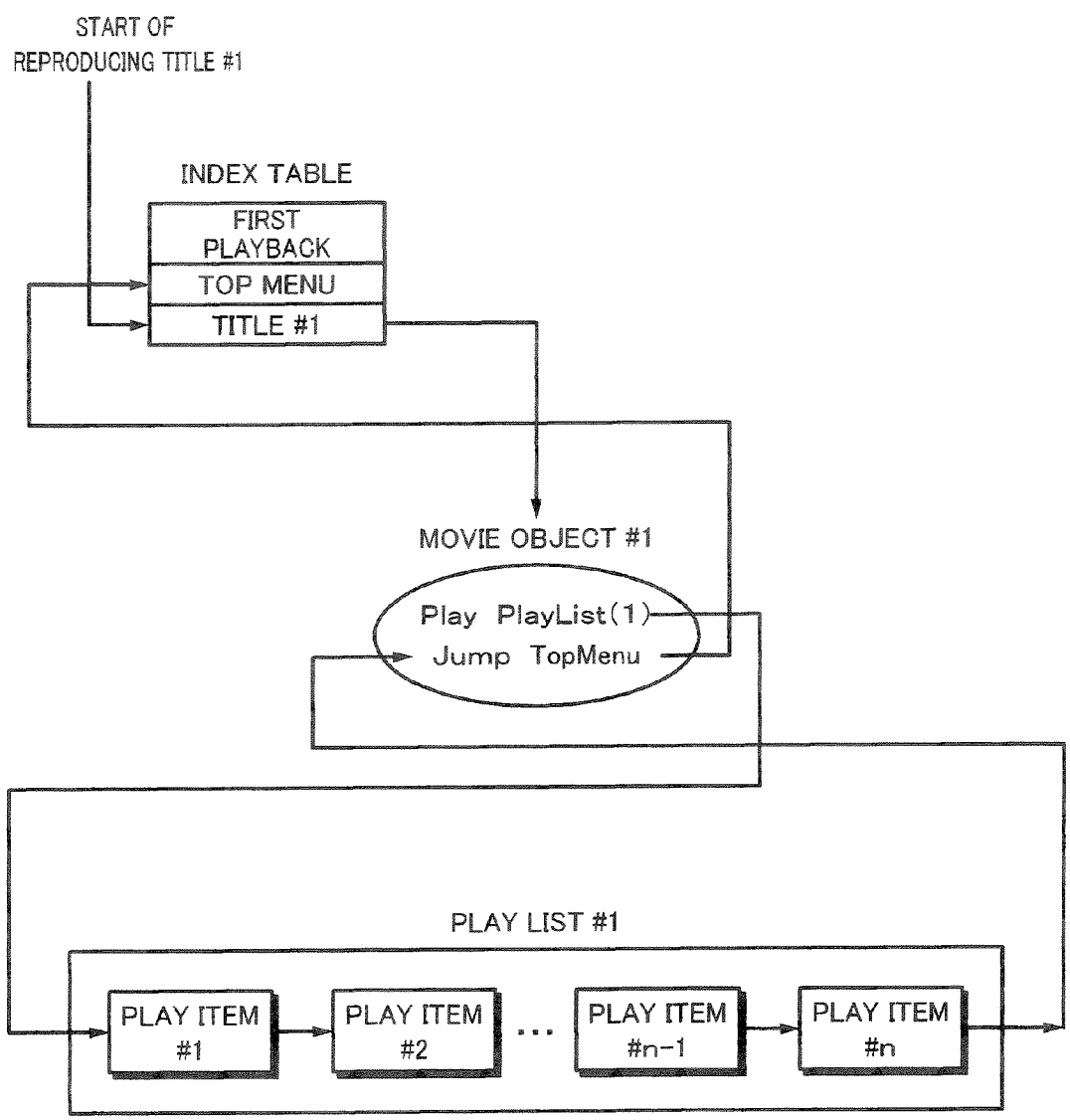
FIG. 24 is a schematic diagram showing an outline of an operation of the BD virtual player.

In the example shown in FIG. 24, assuming that the program contained in movie object #1 is composed of two lines and a command of the first line is "Play PlayList(1)", the player starts reproducing play list #1. Play list #1 is composed of one or more play items. The player successively reproduces play items. After the player has reproduced all the play items of play list #1, the player restores the execution of movie object #1. Thereafter, the player executes a command of the second line. In the example shown in FIG. 24, the command of the second line is "jump TopMenu". The player executes this command, namely a movie object that accomplishes the top menu (Top Menu) contained in the index table.

Figure 25:
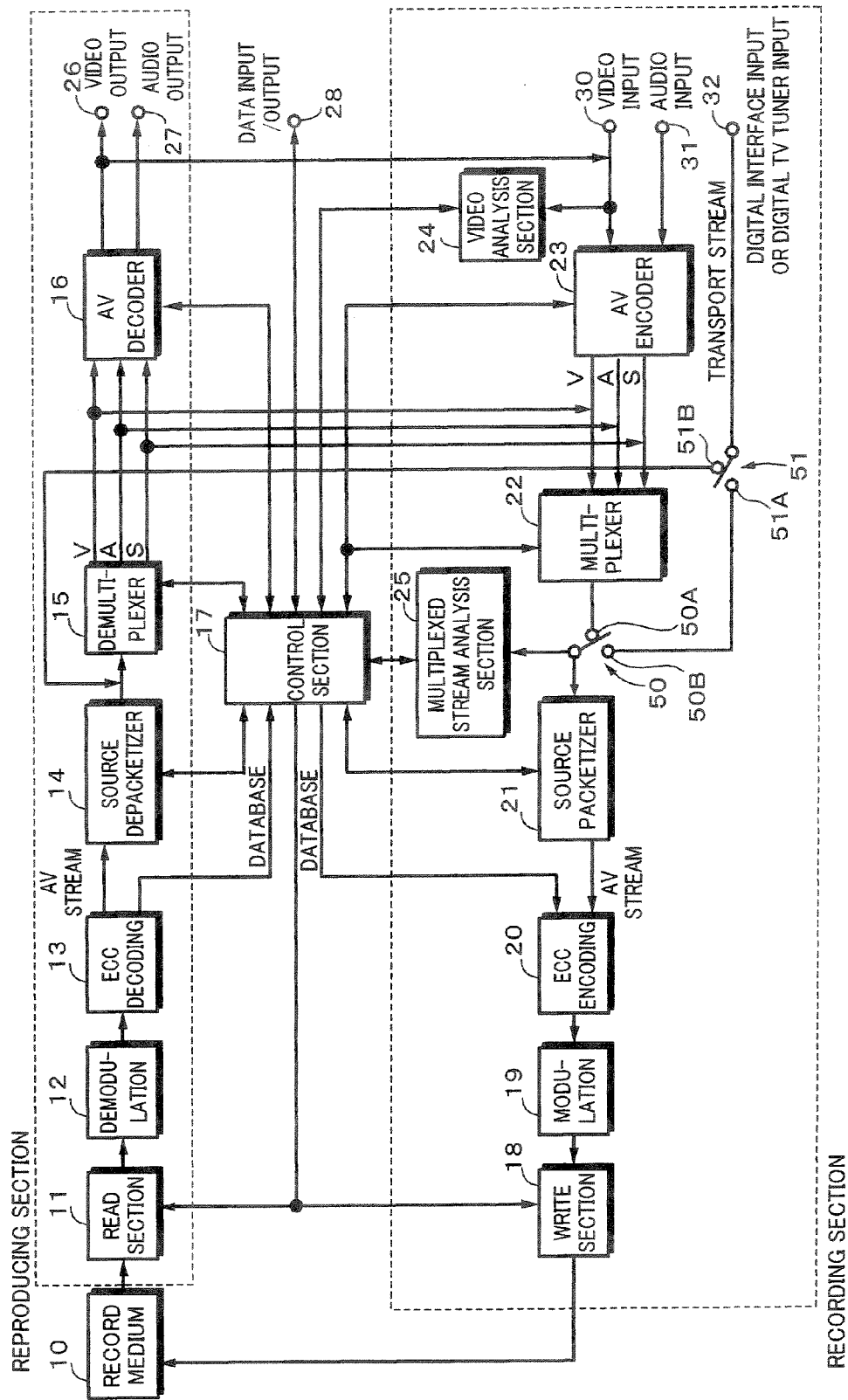
FIG. 25 is a block diagram showing an exemplary structure of a recording and reproducing apparatus according to an embodiment of the present invention.

FIG. 25 shows an exemplary structure of the recording and reproducing apparatus according to an embodiment of the present invention. This recording and reproducing apparatus can be used for example as a recording and reproducing section of a video camera unit. Instead, the recording and reproducing apparatus can be used as an independent unit. In this embodiment, it is contemplated that the recording and reproducing apparatus is used as a recording and reproducing section of a video camera unit. The structure of the recording and reproducing apparatus exemplified in FIG. 25 can be applied both to the foregoing recorder A that stores the order of which titles were recorded, not title numbers, and the recorder B that stores title numbers.

A control section 17 is composed for example of a CPU, a ROM (Read-Only Memory), a RAM (Random-Access Memory), and so forth. The ROM pre-stores a program that causes the CUP to operate and data with which the CUP operates. The RAM is used as a work memory for the CPU. The ROM reads a program and data from the ROM when necessary, uses the RAM as a work memory, and controls the entire recoding and reproducing apparatus. The foregoing BD virtual player is accomplished by the control section 17 according to a program for example stored in the ROM.

Device unique information and data about recording are output from a video camera section (not sown) and input from a data input/output terminal 28 and supplied to the control section 17 of the recording and reproducing apparatus.

Data that are output from a user interface (not shown) that has an operation device such as various types of switches and a simple display device that displays data are input from the data input/output terminal 28. In addition, a display control signal generated in the control section 17 is supplied to the user interface through the data input/output terminal 28. The user interface supplies the display control signal to a monitor device such as a television receiver that displays data according to the display control signal.

First of all, a recording operation of the recording and reproducing apparatus will be described. A video signal that has been captured by a video camera (not shown) is input to an input terminal 30. In addition, an audio signal that has been output corresponding to the video signal is input to an input terminal 31. The input video signal and the input audio signal are supplied to an AV encoder 23. The video signal is also supplied to a video analysis section 24. The AV encoder 23 encodes the input video signal and the input audio data for example according to MPEG2 system and outputs an encoded video stream V, an encoded audio stream A, and system information S.

The AV encoder 23 encodes the audio signal for example into a format of an MPEG1 audio stream or a Dolby AC3 audio stream. The system information S is composed of encode information of the video signal and audio signal, such as byte sizes of encoded picture and audio frame and encode type of picture, and time information about synchronization of video and audio.

These encoded outputs of the AV encoder 23 are supplied to a multiplexer 22. The multiplexer 22 multiplexes the supplied encoded video stream V and audio stream A on the basis of the system information S and outputs a multiplexed stream as an MPEG2 transport stream. In other words, the encoded video stream V, the encoded audio stream A, and the system information S are divided in the size of a payload of a transport packet. A predetermined header is added to each divided portion. As a result, transport packets are obtained. A PID that identifies the type of data is added to the header of each packet.

The multiplexed stream is output from the multiplexer 22 and supplied to a source packetizer 21 and a multiplexed stream analysis section 25 through a terminal 50A of a switch 50. The source packetizer 21 encodes the supplied multiplexed stream according to an application format of the record medium.

A clip AV stream encoded by the source packetizer 21 is supplied to an ECC (Error Correction Coding) encoding section 20. The ECC encoding section 20 encodes the clip AV stream with error correction code. A modulation section 19 modulates the encoded stream with record code. The modulated stream is supplied to a write section 18. The write section 18 records the modulated clip AV stream modulated with record code by the modulation section 19 to a recordable record medium 10 according to the control signal supplied from the control section 17.

The recording and reproducing apparatus directly inputs the transport stream of which a clip AV stream has been multiplexed and records the transport stream to the record medium. For example, a transport stream of a digital television broadcast or the like that is outputted from a digital interface or a digital television tuner is input to an input terminal 32.

It is contemplated that there are two methods of recording an input transport stream. In the first method, an input transport stream is transparently recorded. In the second method, an input transport stream is re-encoded and then recorded for example to reduce the record bit rate. The user selects one of the two methods with the user interface to record an input transport stream. A control signal corresponding to this operation is supplied to the control section 17 through the data input/output terminal 28. The control section 17 controls each section of the recording and reproducing apparatus in one of the two methods according to this control signal.

When the input transport stream is transparently recorded to the record medium 10, a terminal 50B of the switch 50 is selected and a terminal 51A of a switch 51 is selected. The transport stream inputted from the input terminal 32 is supplied to the source packetizer 21 and the multiplexed stream analysis section 25 through the switches 51 and 50. Thereafter, the transport stream is encoded and recorded in the same manner as the video signal and audio signal inputted from the input terminal 30 and the input terminal 31, respectively, are encoded and recorded.

When the input transport stream is re-encoded and then recorded to the record medium 10, a terminal 51B of the switch 51 is selected and thereby the transport stream inputted from the input terminal 32 is supplied to a demultiplexer 15. The demultiplexer 15 demultiplexes the transport stream into the encoded video stream V, the encoded audio stream A, and the system information S. The demultiplexer 15 supplies the encoded video stream V to an AV decoder 16 and the encoded audio stream A and the system information S to the multiplexer 22.

The AV decoder 16 decodes the encoded video stream V supplied from the demultiplexer 15 and supplies the decoded video signal to the AV encoder 23. The AV encoder 23 encodes the supplied video signal and obtains an encoded video stream V. The encoded video stream V is supplied to the multiplexer 22.

The multiplexer 22 multiplexes the encoded video stream V encoded and supplied by the AV encoder 23 and the encoded audio stream A demultiplexed by the demultiplexer 15 according to the system information S demultiplexed by the demultiplexer 15 and outputs a multiplexed stream. Thereafter, the multiplexed stream is encoded and recorded to the record medium 10 in the same manner as the video signal and the audio signal inputted from the input terminal 30 and the input terminal 31 are encoded and recorded.

The recording and reproducing apparatus records the clip AV stream file to the record medium 10 for example based on the BD-RE standard. In addition, the recording and reproducing apparatus also records application database information associated with the clip AV stream file to be recorded to the record medium 10. The application database information is created by the control section 17 on the basis of feature information of a moving picture supplied from the video analysis section 24, feature information of a clip AV stream supplied from the multiplexed stream analysis section 25, and user command information that is input from the data input/output terminal 28.

The feature information of the moving picture supplied from the video analysis section 24 is information created in the recording and reproducing apparatus when the AV encoder 23 encodes the video signal and records the encoded video signal to the record medium 10. Supplied to the video analysis section 24 is a video signal inputted from the input terminal 30 or a video signal of which a transport stream inputted from the input terminal 32 has been demultiplexed by the demultiplexer 15 and decoded by the AV decoder 16. The video analysis section 24 analyzes contents of the supplied video signal and creates information about an image of a feature mark point of the input video signal. For example, the video analysis section 24 detects feature mark points such as a program start point, a scene change point, and CM (Commercial Message) start and end points from the input video signal and obtains command information of images of the detected mark points. Instead, thumbnail images of images of mark points may be created. A thumbnail image is an image of which real image data are reduced for example by a thin-out process. The position of a thumbnail image on a clip AV stream can be represented with a PTS.

Command information of these images, thumbnail images, and position information (for example, PTS) of thumbnail images are supplied to the multiplexer 22 through the control section 17. When the multiplexer 22 multiplexes an encoded picture of which images of mark points commanded by the control section 17 have been encoded, the multiplexer 22 returns address information of the encoded picture on the clip AV stream to the control section 17. The control section 17 correlates the type of a feature image with address information of the corresponding encoded picture on the clip AV stream and stores the correlated data for example in the RAM.

The feature information of the clip AV stream obtained from the multiplexed stream analysis section 25 is information associated with encode information of the clip AV stream to be recorded and is created in the moving picture recording and reproducing apparatus. The feature information of the clip AV stream contains time stamp of an entry point of the clip AV stream and the corresponding address information. In addition, the feature information of the clip AV stream contains discontinuity information of a STC (System Time Clock), change information of contents of a program, address information corresponding to an arrival time, and so forth.

When a transport stream that is input from the input terminal 32 is transparently recorded to the record medium 10, the multiplexed stream analysis section 25 detects images of feature mark points from a clip AV stream and creates information about the types and addresses of the detected images. This information becomes data contained in block ClipMark of the clip information file. Thus, the feature information of the clip AV stream obtained by the multiplexed stream analysis section 25 is stored in the clip information file, which is a database of the clip AV stream. These information obtained by the multiplexed stream analysis section 25 is temporarily stored in the RAM of the control section 17.

Command information that the user has issued to the user interface (not shown) is supplied from the data input/output terminal 28 to the control section 17. This command information includes designation information of a reproduction region that the user likes in the clip AV stream, characters that describe the contents of the reproduction region, a book mark point that the user sets for his or her favorite scene, a time stamp of a resume point in the clip AV stream, and so forth. These user's command information is temporarily stored in the RAM of the control section 17. These command information is stored in a database of a play list on the record medium 10.

The control section 17 creates a database of a clip AV stream (clip information), a database of a play list (play list file), management information for contents of a record medium (index file), and thumbnail information on the basis of the foregoing input information stored in the RAM, namely feature information of a moving picture obtained from the video analysis section 24, feature information of a clip AV stream obtained from the multiplexed stream analysis section 25, and user command information inputted from the data input/output terminal 28.

When the control section 17 creates an index file, the control section 17 can create extension data with which an index file, a play list file, and/or a clip information file are extended on the basis of data about the apparatus and information about recording that are input from the data input/output terminal 28. In other words, the control section 17 embeds extension data in a file on the basis of data inputted from the data input/output terminal 28 according to the process described with reference to the flow chart shown in FIG. 15.

These database information is read from the RAM of the control section 17, supplied from the control section 17 to the ECC encoding section 20, encoded with error correction code by the ECC section 20, modulated with record code by the modulation section 19, and supplied to the write section 18 in the same manner as the clip AV stream. The write section 18 records the database information that has been encoded with record code to the record medium 10 according to the control signal supplied from the control section 17.

Next, the reproducing operation of the recording and reproducing apparatus will be described. An application database information composed of a clip AV stream file, a play list file, and an index file has been created in the same manner as described in the part of the recording operation of the recording and reproducing apparatus and recorded on the record medium 10. When the record medium 10 is loaded into a drive device (not shown), the control section 17 commands a read section 11 to read the application database information and the movie object file from the record medium 10. When the read section 11 is commanded to read the application database information and the movie object file, the read section 11 reads them from the record medium 10. An output of the read section 11 is supplied to a demodulation section 12.

The demodulation section 12 demodulates the output of the read section 11, decodes record code, and obtains digital data. An output of the demodulation section 12 is supplied to an ECC decoding section 13. The ECC decoding section 13 decodes the error correction code and performs an error correction process for the decoded data. The error corrected application database information is supplied to the control section 17.

The control section 17 outputs a menu screen that displays a list of titles recorded on the record medium to the user interface through a user interface input/output terminal 28 on the basis of the application database information and the movie object file. The menu screen is displayed for example on the display section of the user interface in a predetermined manner. The user selects his or her desired title from the menu screen and performs a reproduction operation for the selected title on the user interface. A control signal corresponding to the operation is output from the user interface and supplied to the control section 17 through the terminal 28.

The control section 17 commands the read section 11 to read a clip AV stream file necessary to reproduce the selected title on the basis of the contents of the index file and the movie object file according to the control signal. The read section 11 reads the clip AV stream file from the record medium 10 as commanded. An output of the read section 11 is supplied to the demodulation section 12. The demodulation section 12 demodulates the supplied signal, decodes record code, and outputs digital data to the ECC decoding section 13. The ECC decoding section 13 decodes error correction code of the supplied digital data, corrects errors of the decoded data, and outputs an error-corrected clip AV stream file. The error-corrected clip AV stream file is supplied to a file system section (not shown) of the control section 17. The file system section processes the error-corrected clip AV stream file and supplies the processed file to a source depacketizer 14.

The source depacketizer 14 converts the clip AV stream file recorded in the application format on the record medium 10 into a stream in the format of the demultiplexer 15 under the control of the control section 17. The source depacketizer 14 divides an MPEG2 transport stream reproduced from the record medium 10 into source packets, removes the header from the source packets, and obtains transport packets. The transport packets as a clip AV stream are supplied to the demultiplexer 15.

The demultiplexer 15 outputs a video stream V, an audio stream A, and system information S, which compose a reproduction region (PlayItem) designated by the control section 17, of the clip AV stream supplied from the source depacketizer 14 under the control of the control section 17 and supplies them to the AV decoder 16. For example, the demultiplexer 15 selects supplied transport packets on the basis of their PIDs, removes the transport packet header therefrom, and outputs the resultant transport packets. The AV decoder 16 decodes the supplied video stream V and audio stream A and supplies the decoded reproduction video signal and audio signal to a video output terminal 26 and an audio output terminal 27, respectively.

Next, a process that the recording and reproducing apparatus performs for a disc on which another recording and reproducing apparatus has recorded data or the like will be described. In this case, it is assumed that the recording and reproducing apparatus is the recorder of B type that stores title numbers when the apparatus edits a title or the like. The recording and reproducing apparatus as the recorder of B type needs to know whether or not a title has been edited on the disc according to the system that does not store title numbers.

When the disc is loaded into the recording and reproducing apparatus, it reads index file "index.bdmv" and movie object file "MovieObject.bdmv", obtains information of a movie object that each title calls with reference to block Indexes( ), references movie object file "MovieObject.bdmv" based on the obtained information, and obtains information of a play list that each movie object references.

In the state shown in FIG. 21, when value title_id corresponding to the title number of each title is different from the order of movie objects called from each title (values of mobj_id of the for loop statement as loop variable mobj_id of block MovieObjects( ) in movie object file "MovieObject.bdmv"), it can be determined that the recording and reproducing apparatus as the recorder of A type has edited a title, for example deleted a title.

In addition, it can be contemplated that information about a recorder that has recorded the newest data on the disc and information about the edited contents are contained in a predetermined location, for example, extension data block ExtensionData( ) of index file "index.bdmv". In this case, it is determined whether or not the recorder that has recorded the newest data on the disc is the recorder of A type. When the determined result denotes that the recorder is the recorder of A type, as described above, it can be determined whether or not the recorder has edited a title according to the system that does not store title numbers on the basis of the determined result of whether or not values of title_id_ref are successive values.

When the determined result denotes that the recording and reproducing apparatus as the recorder of A type has edited a title such as deleted a title on the disc loaded into the recording and reproducing apparatus as the recorder of B type, as described with reference to FIG. 21 and FIG. 22, the recording and reproducing apparatus as the recorder as B type performs a process of restoring a title and a process of updating a menu according to value title_id_ref.

In the foregoing, the recording and reproducing apparatus shown in FIG. 25 was described as an apparatus that records video data and audio data that are output from a video camera to the record medium 10. Instead, an embodiment of the present invention may be applied to an editing unit that performs an editing process for video data that have been input and that outputs the edited video data. In addition, the structure shown in FIG. 25 may be a recording apparatus of which the structure of a reproducing section side is removed from the recording and reproducing apparatus. In the foregoing, the record medium 10 was described as a disc-shaped record medium based on the BD-RE standard. However, the record medium 10 is not limited to such an example. Instead, an embodiment of the present invention may be applied to other record mediums such as a semiconductor memory and a hard disk.

In the foregoing, the recoding and reproducing apparatus shown in FIG. 25 was described to be structured as hardware. However, instead, the recording and reproducing apparatus may be composed of software except for mechanical sections such as a drive section into which the record medium 10 is loaded. In this case, software is pre-stored for example in the ROM of the control section 17. Instead, the moving picture recording and reproducing apparatus may be structured on a computer device such as a personal computer. In this case, software that causes the computer device to operate as the moving picture recording and reproducing apparatus is provided such that the software is recorded on a record medium such as a ROM or a DVD-ROM. When the computer device can be connected to a network such as the Internet, such software can be provided therethrough.

DESCRIPTION OF REFERENCE NUMERALS

10 RECORD MEDIUM
11 READ SECTION
17 CONTROL SECTION
18 WRITE SECTION
28 DATA INPUT/OUTPUT TERMINAL
100, 110 MENU SCREEN
S10 OBTAIN LENGTH OF DATA TO BE RECORDED AND SET IT TO VALUE OF ext_data_length(n+1).
S11 CHECK ext_data_length AND ext_data_start_address OF EACH BLOCK OF ext_data_entry( ) OF ExtensionData( ) AND OBTAIN USE STATE OF data_block.
S12 DOES data_block HAVE SUCCESSIVE BLANK AREA EQUAL TO OR LARGER THAN ext_data_length (n+1)?
S13 INCREASE VALUE OF length OF ExtensionData( ) AND CREATE SUCCESSIVE BLANK AREA EQUAL TO OR LARGER THAN ext_data_length (n+1).
S14 DECIDE START ADDRESS OF AREA IN WHICH DATA ARE WRITTEN AND SPECIFY DECIDED START ADDRESS AS ext_data_start_address(n+1).
S15 WRITE DATA HAVING LENGTH OF ext_data_length (n+1) FROM ADDRESS REPRESENTED BY ext_data_start_address(n+1).
S16 ADD ext_data_length(n+1) AND ext_data_start_address(n+1) TO ext_data_entry( ).
S20 OBTAIN ID1 FROM STANDARD ON WHICH DATA TO BE READ ARE BASED.
S21 OBTAIN ID2 FROM TYPE OF DATA TO BE READ BASED ON ID1.
S22 SUCCESSIVELY READ BLOCKS OF ext_data_entry( ) FROM ExtensionData( ).
S23 DO ID1 AND ID2 OF BLOCK ext_data_entry( ) MATCH THOSE OBTAINED AT STEPS S20 AND S21?
S24 READ ext_data_length(i) AND ext_data_start_address (i).
S25 READ DATA FOR LENGTH REPRESENTED BY ext_data_length(i) FROM ADDRESS REPRESENTED BY ext_data_start_address(i).
S26 HAS ext_data_entry( ) BEEN READ?
S27 THERE ARE NO DATA TRIED TO BE READ.
S50 WITH REFERENCE TO Indexes( ), DELETE MOVIE OBJECTS OTHER THAN THOSE THAT COMPOSE TITLE.
S51 WITH REFERENCE TO PlayList_attribute, DELETE PLAY LISTS OTHER THAN THOSE THAT COMPOSE TITLE.
S52 WITH REFERENCE TO title_id_ref OF PLAY LIST THAT COMPOSES TITLE, REWRITE Indexes( ) SUCH THAT TITLE NUMBER OF TITLE USED TO REPRODUCE EACH PLAY LIST MATCHES title_id_ref. CREATE PLAY LIST AND MOVIE OBJECT CORRESPONDING TO UNUSED TITLE.
S53 UPDATE TableOfPlayLists( )
S54 CREATE CLIP, PLAY LIST, AND MOVIE OBJECT TO DISPLAY TOP MENU.
S55 SET MOVIE OBJECT NUMBER FOR TOP MENU TO TopMenu_mobj_id_ref OF TopMenu( ) OF Indexes( ).
S56 UPDATE FirstPlayback( ) OF Indexes( ).
S57 UPDATE TableOfPlayLists( ).

The invention claimed is:

1. A recording apparatus which records at least content data and reproduction control information to a record medium, the content data being caused to be reproduced with the reproduction control information, the recording apparatus comprising:
a recording section which records the content data to the record medium; and
a controlling section which causes a clip information file, a play list file, an object file, and an index file to be created for the content data recorded on the record medium, the clip information file containing clip information which represents attribute information of the content data, the play list file containing a play list which calls the clip information, the object file containing an object which represents a method of reproducing the content data which calls the play list, the index file containing an index table which contains a title which calls the object,
wherein the controlling section causes additional information which represents a title to which the play list file originally belonged to be added to the index file when the play list file is created such that the play list file is additionally associated with the title to which the play list file originally belonged even when information which represents a corresponding title, which calls the object in the index table, is a modification.

2. The recording apparatus as set forth in claim 1,
wherein the controlling section causes a table which stores information which represents an attribute of the play list file to be created in an order of which the play list file was recorded, and
wherein the controlling section causes at least information which represents the title to which the play list file originally belonged when the play list file was created to be stored in the table.

3. The recording apparatus as set forth in claim 2,
wherein the controlling section causes information which identifies the play list file and information which represents a type based on a purpose of which the play list file is created to be also stored in the table.

4. The recording apparatus as set forth in claim 2,
wherein the controlling section causes the play list file which contains a play list reproduced from the title to be decided according to an arrangement of the titles on the index table and an arrangement of play list files other than a play list file with which a menu is reproduced.

5. A recording method of recording at least content data and reproduction control information to a record medium using a recording device having a microprocessor, the content data being caused to be reproduced with the reproduction control information, the recording method comprising the steps of:
causing, using the recording device, a clip information file, a play list file, an object file, and an index file to be created for the content data recorded on the record medium, the clip information file containing clip information which represents attribute information of the content data, the play list file containing a play list which calls the clip information, the object file containing an object which represents a method of reproducing the content data which calls the play list, the index file containing an index table which contains a title which calls the object; and causing, using the recording device, additional information which represents a title to which the play list file originally belonged to be added to the index file when the play list file is created such that the play list file is additionally associated with the title to which the play list file originally belonged even when information which represents a corresponding title, which calls the object in the index table, is a modification.

6. A non-transitory computer readable medium having stored thereon a record program which causes a computer device to execute a recording method of recording at least content data and reproduction control information to a record medium, the content data being caused to be reproduced with the reproduction control information, the recording method comprising the steps of:

causing a clip information file, a play list file, an object file, and an index file to be created for the content data recorded on the record medium, the clip information file containing clip information which represents attribute information of the content data, the play list file containing a play list which calls the clip information, the object file containing an object which represents a method of reproducing the content data which calls the play list, the index file containing an index table which contains a title which calls the object; and causing additional information which represents a title to which the play list file originally belonged to be added to the index file when the play list file is created such that the play list file is additionally associated with the title to which the play list file originally belonged even when information which represents a corresponding title, which calls the object in the index table, is a modification.

* * * * *